(12) United States Patent
Cherry

(10) Patent No.: US 8,322,617 B2
(45) Date of Patent: Dec. 4, 2012

(54) SYSTEMS AND METHODS FOR SELECTIVELY MASKING A SCAN VOLUME OF A DATA READER

(75) Inventor: Craig Douglas Cherry, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 248 days.

(21) Appl. No.: 12/698,410

(22) Filed: Feb. 2, 2010

(65) Prior Publication Data

US 2010/0193588 A1   Aug. 5, 2010

Related U.S. Application Data

(60) Provisional application No. 61/149,898, filed on Feb. 4, 2009.

(51) Int. Cl.
*G06K 7/10* (2006.01)

(52) U.S. Cl. .................................. 235/454; 235/462.2

(58) Field of Classification Search ............. 235/462.01, 235/462.08, 462.12, 462.2, 462.42, 462.45, 235/454
See application file for complete search history.

(56) References Cited

U.S. PATENT DOCUMENTS

| | | | |
|---|---|---|---|
| 4,000,397 A | 12/1976 | Hebert et al. | |
| 4,792,666 A | 12/1988 | Cherry et al. | |
| 4,822,986 A | 4/1989 | Guthmueller et al. | |
| 4,861,972 A | 8/1989 | Elliott et al. | |
| 4,866,257 A | 9/1989 | Elliott et al. | |
| 5,155,343 A | 10/1992 | Chandler et al. | |
| 5,396,054 A | 3/1995 | Krichever et al. | |
| 5,422,470 A * | 6/1995 | Kubo | 235/462.09 |
| 5,446,271 A | 8/1995 | Cherry et al. | |
| 5,463,211 A | 10/1995 | Arends et al. | |
| 5,493,108 A | 2/1996 | Cherry et al. | |
| 5,534,684 A | 7/1996 | Danielson | |
| 5,591,952 A | 1/1997 | Krichever et al. | |

(Continued)

FOREIGN PATENT DOCUMENTS

JP    63-133281    6/1988

(Continued)

OTHER PUBLICATIONS

International Search Report and Written Opinion, International Patent Application No. PCT/US2010/022902, mailed Sep. 1, 2010, 11 pages.

*Primary Examiner* — Jamara Franklin
(74) *Attorney, Agent, or Firm* — Stoel Rives LLP

(57) ABSTRACT

Systems and methods are provided for selectively reading and accepting optical codes within a scan volume of the data reader. A method of processing an optical code within the scan volume comprises acquiring, via the data reader, scan data including an image or scan of an optical code located within the scan volume of the data reader, processing the scan data for decodable data corresponding to the optical code, and determining whether to accept or reject the optical code based on a position within the scan volume of the optical code relative to a configurable exclusion zone. The determination of whether to accept or reject the optical code may be based on other conditions of the optical code, such as a position of the optical code within the depth of field of the data reader, a symbology type of the optical code, and data encoded in the optical code.

36 Claims, 11 Drawing Sheets

U.S. PATENT DOCUMENTS

| | | | |
|---|---|---|---|
| 5,635,699 A | 6/1997 | Cherry et al. | |
| 5,756,981 A | 5/1998 | Roustaei et al. | |
| 5,786,582 A | 7/1998 | Roustaei et al. | |
| 5,837,988 A | 11/1998 | Bobba et al. | |
| 5,945,661 A * | 8/1999 | Nukui et al. | 235/462.45 |
| 6,060,722 A | 5/2000 | Havens et al. | |
| 6,070,800 A | 6/2000 | Fujita et al. | |
| 6,142,376 A | 11/2000 | Cherry et al. | |
| 6,176,429 B1 | 1/2001 | Reddersen et al. | |
| 6,205,406 B1 | 3/2001 | Hahn et al. | |
| 6,330,521 B1 | 12/2001 | Hahn et al. | |
| 6,505,778 B1 | 1/2003 | Reddersen et al. | |
| 6,547,139 B1 | 4/2003 | Havens et al. | |
| 6,575,368 B1 | 6/2003 | Tamburrini et al. | |
| 6,612,495 B2 | 9/2003 | Reddersen et al. | |
| 6,637,658 B2 * | 10/2003 | Barber et al. | 235/462.45 |
| 6,877,663 B2 | 4/2005 | Kelley et al. | |
| 6,932,273 B2 | 8/2005 | McQueen | |
| 6,969,003 B2 | 11/2005 | Havens et al. | |
| 7,025,271 B2 | 4/2006 | Dvorkis et al. | |
| 7,083,098 B2 * | 8/2006 | Joseph et al. | 235/454 |
| 7,137,555 B2 | 11/2006 | Bremer et al. | |
| 7,299,975 B2 | 11/2007 | McQueen et al. | |
| 2003/0222147 A1 | 12/2003 | Havens et al. | |
| 2004/0020990 A1 | 2/2004 | Havens et al. | |
| 2006/0071078 A1 | 4/2006 | Olmstead | |
| 2006/0081712 A1 | 4/2006 | Rudeen et al. | |
| 2006/0278708 A1 | 12/2006 | Olmstead | |
| 2007/0158427 A1 | 7/2007 | Zhu et al. | |
| 2007/0297021 A1 | 12/2007 | Smith | |
| 2008/0135620 A1 | 6/2008 | Zhu et al. | |
| 2008/0169347 A1 | 7/2008 | Olmstead | |

FOREIGN PATENT DOCUMENTS

| | | |
|---|---|---|
| JP | 10-187875 | 7/1998 |
| JP | 2003-187180 | 7/2003 |
| JP | 2006-259045 | 9/2006 |
| WO | WO 01/29576 | 4/2001 |
| WO | WO 2008/112216 | 9/2008 |

* cited by examiner

SYSTEMS AND METHODS FOR SELECTIVELY MASKING A SCAN VOLUME OF A DATA READER

RELATED APPLICATIONS

This application claims the benefit under 35 U.S.C. §119(e) of U.S. Provisional Application No. 61/149,898, filed Feb. 4, 2009, which is hereby incorporated by reference in its entirety.

TECHNICAL FIELD

The field of the present disclosure relates generally to data readers and, in particular, to systems and methods for selectively reading and accepting optical codes within a scan volume of a data reader.

BACKGROUND INFORMATION

Optical codes have widespread applications. For example, optical codes can be used to identify a class of objects (e.g., merchandise) or unique items (e.g., patents). As a result, optical codes are found on a wide variety of objects, such as retail goods, company assets, and documents, and help track production at manufacturing facilities and inventory at stores (by scanning items as they arrive and as they are sold).

An optical code is essentially a machine-readable representation of information in a visual format on a surface of the object (i.e., a barcode). Some optical codes use a dark ink on a white substrate to create high and low reflectance upon scanning. Based on the symbology being used (e.g., UPC, Code 39, Code 128, and PDF417), an optical code may comprise data characters (or codewords in the case of, e.g., PDF417) and/or overhead characters represented by a particular sequence of bars and spaces (which may have varying widths).

Optical code readers or data readers are used to capture optical codes or other symbols or information imprinted on various surfaces in order to transmit the information encoded in the optical code or symbol to a host processing device. Two types of commonly used data readers are flying spot scanners and imaging based scanners. Flying spot laser scanners generally obtain optical code information by sweeping a laser spot across the optical code. The laser spot may be generated by a laser light source which is then directed towards an oscillating or rotating reflecting surface, typically a mirror. The light reflected from the optical code is collected by a photosensor, which outputs an analog waveform representing the relative spacing of the bars in the optical code. The analog signal may then be digitized and decoded into data representing the information encoded in the optical code.

Imaging based scanners include solid state image circuitry, such as charge coupled devices (CCDs) or complementary metal-oxide semiconductor (CMOS) devices, and may be implemented using a one-dimensional or two-dimensional imaging array of photosensors (or pixels) to capture the optical code. One-dimensional CCD readers capture a linear cross section of the optical code, producing an analog waveform whose amplitude represents the relative darkness and lightness of the optical code. Two-dimensional CCD or CMOS readers capture an entire two-dimensional image. Often only select portions of the image data are stored and processed. The select portions of the image data are sometimes referred to as virtual scan lines because the select portions are analogous to a signal generated by reflection of a moving laser beam spot scanning across the optical code.

Traditionally, all decodable optical codes within a scan volume of a data reader are read and accepted. Thus, optical codes that should not be read and accepted but never the less fall within the scan volume may unintentionally be read and accepted. For example, data readers located in space-constrained locations may read and accept optical codes on objects displayed proximate the data reader, such as products for sale and displayed in a convenience store checkout area. By way of another example, objects delivered by a conveyor to an operator may be read and accepted while on the conveyor instead of when the operator individually sweeps the objects past the data reader. Accordingly, the present inventor has identified a need to selectively read and accept optical codes within a scan volume of a data reader.

DETAILED DESCRIPTION OF EMBODIMENTS

Figure 1:
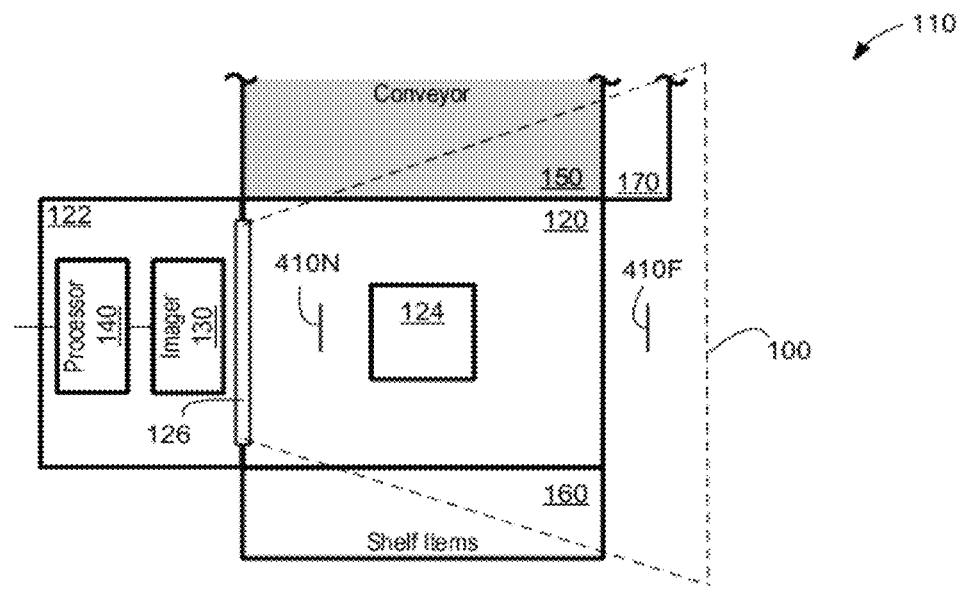
FIG. 1 is a schematic diagram illustrating a top view of a scan volume associated with a data reader, according to one embodiment.

With reference to the above-listed drawings, this section describes particular embodiments and their detailed construction and operation. The embodiments described herein are set forth by way of illustration only. In light of the teachings herein, those skilled in the art will recognize that there may be equivalents to what is expressly or inherently taught herein. For example, variations can be made to the embodiments described herein and other embodiments are possible. It is not always practical to exhaustively catalog all possible embodiments and all possible variations of the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The present inventor has recognized that it may not be desirable to read and accept optical codes in certain portions of a data reader's scan volume. For example, referring to FIG. 1, it may be desirable to ignore decodable optical codes on certain objects, such as objects on conveyor 150, shelf items 160, or shelf items 170, within a scan volume 100 associated with a data reader or optical code reader 110 of FIG. 1 and read and accept only optical codes presented to the data reader 110 (e.g., proximate window 126). If multiple objects with optical codes thereon are read (and accepted) while on the conveyor 150, the operator may receive an indication that some of the objects were read and accepted (via an audible beep), but not be able to easily identify which of the objects have already been scanned. Thus, some optical codes may be read and accepted again when the operator presents the objects to the data reader 110 (e.g., proximate window 126) or the operator may not scan certain objects under the mistaken belief that the objects have already been scanned. Additionally, optical codes of one or more shelf items 160 and 170 may be read and accepted while on the shelf even though a customer does not intend to purchase any of the shelf items. Accordingly, a preferred embodiment selectively reads and accepts optical codes within a scan volume of an data reader to help ensure that only optical codes intentionally presented to the data reader are read and accepted.

FIG. 1 is a schematic diagram illustrating a top view of the scan volume 100 associated with the data reader 110, according to one embodiment. The data reader 110 includes a lower housing portion 120 and an upper housing portion 122. A data reader, such as an imaging based scanner 1120 of FIG. 11, an laser based scanner 1130 of FIG. 11, or both, obtains data for reading encoded symbols through a lower window 124 supported on the lower housing 120 and an upper window 126 supported on the upper housing 122. The lower window 124 is arranged in a generally horizontal plane and the upper window 126 is arranged in a generally vertical plane. The scan volume 100 associated with an imager 130 will be further discussed with reference to FIGS. 1, 2, 3, and 4. However, it should be recognized that the discussion and examples provided with reference to FIGS. 1, 2, 3, and 4 are equally applicable to a data reader including multiple data readers (e.g., another data reader associated with the window 124), each of which may have multiple image fields associated therewith. The imager 130 may comprise an imaging based scanner (e.g., the imaging based scanner 1120 of FIG. 11) or may comprise a separate imager for capturing an image of an object (e.g., a CCD or CMOS digital camera) along with any associated optics. Likewise, the processor 140 may comprise a processing unit 1150 (see FIG. 11) or any other suitable commercially available processor or logic machine capable of executing instructions.

Figure 2:
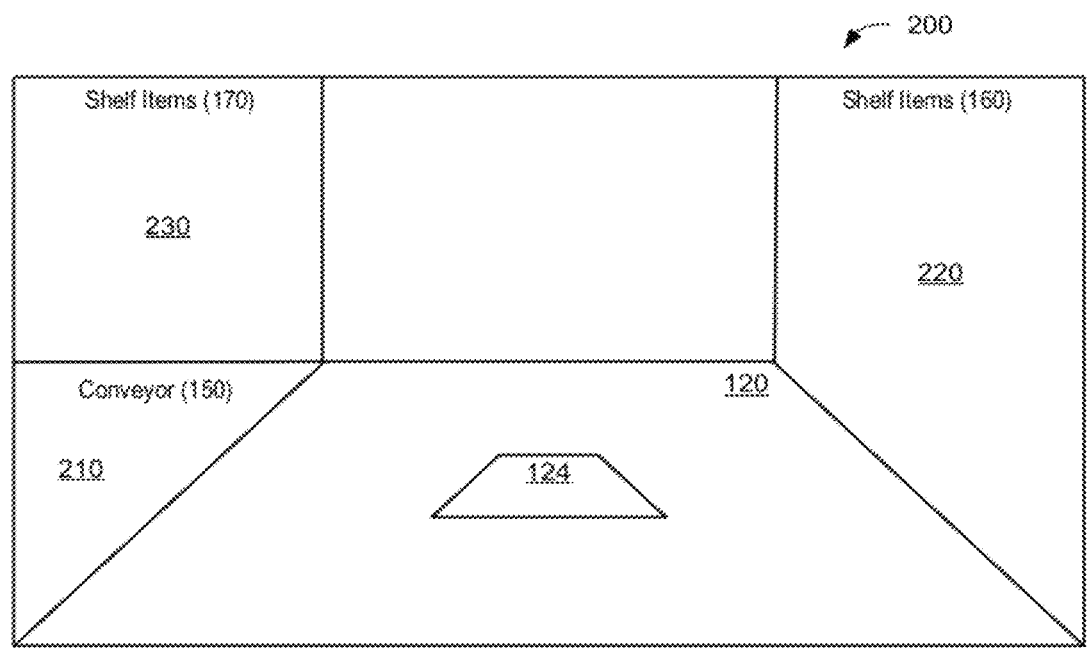
FIG. 2 is a schematic diagram illustrating various exclusion zones associated with an example image captured with the data reader of FIG. 1, according to one embodiment.
Figure 3:
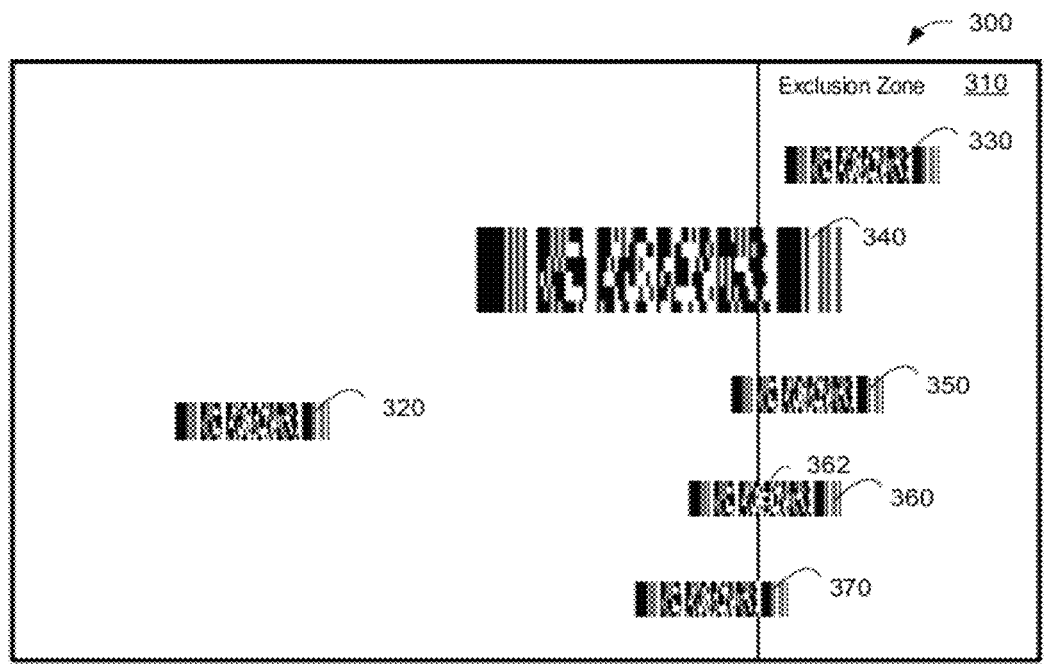
FIG. 3 is a schematic diagram illustrating examples of various optical code positions relative to an exclusion zone, according to one embodiment.
Figure 4:
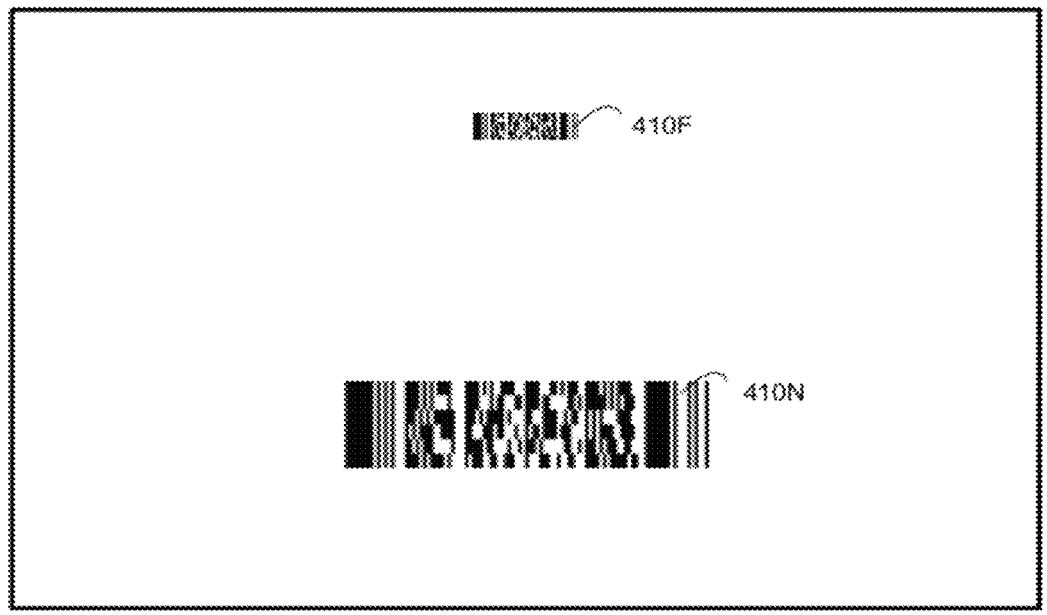
FIG. 4 is a schematic diagram illustrating examples of various optical code positions within a depth of field of a data reader.

FIG. 2 is a schematic diagram of an example image 200 captured using the data reader 110 of FIG. 1. Because it may be desirable to ignore decodable optical codes on certain objects, such as objects on the conveyor 150, shelf items 160, or shelf items 170, optical codes at least partially falling within exclusion zones 210, 220, and 230 may be selectively read and accepted. In other words, even though the data reader is able to detect and decode an optical code located in one of the exclusion zones 210, 220, and 230 into data usable by a host (e.g., host 1197 of FIG. 11), the decoded data will not be accepted by the data reader and subsequently transmitted to the host. Thus, according to one method, portions of a scan volume of a data reader may be selectively masked using one or more exclusion zones. With reference to FIG. 2, the exclusion zone 210 generally corresponds to the conveyor 150, the exclusion zone 220 generally corresponds to an area of image 200 where shelf items 160 appear, and the exclusion zone 230 generally corresponds to an area of image 200 where shelf items 170 appear. Each exclusion zone may have one or more exclusion parameters associated therewith that define whether to exclude or reject an optical code based on a condition of the optical code, such as a position of the optical code relative to the exclusion zone, a position of the optical code within the depth of field of the data reader, a symbology type of the optical code, and data encoded in the optical code. Because exclusion zones may have different exclusion parameters associated therewith, it may be desirable to separately define adjacent exclusion zones. For example, while exclusion zones 210 and 230 may be combined into one exclusion zone that is a single, contiguous zone, it may be desirable to keep the zones separate so that optical codes can be excluded in each zone based on data content. For example, optical codes that contain certain data typical of shelf items (e.g., magazines and gum) are excluded when appearing in the exclusion zone 230, but not when appearing in exclusion zone 210.

For imaging based scanners, the exclusion zones may be defined based on the location of the respective exclusion zone within a captured image. For example, if the image 200 comprises a 1280×1024 image (e.g., 1280 pixels in a horizontal direction and 1024 pixels in a vertical direction), exclusion zone 210 may be defined by the set of all pixels bound by a triangle having vertices with the coordinates (0,512), (0,1023), and (320,512) assuming the origin of the coordinate system is located in the upper-left portion of the image 200. Likewise, the exclusion zone 220 may be defined by the set of all pixels bound by a polygon having vertices with the coordinates (960,0), (960,512), (1279,1023), and (1279,0). If exclusion zones 210 and 230 are defined such that they do not overlap, the exclusion zone 230 may be defined by the set of all pixels bound by a rectangle having vertices with the coordinates (0,0), (0,511), (320,511), and (320,0). In addition to defining exclusion zones by listing coordinate vertices, exclusion zones can be defined in terms of operations on the coordinates of existing zones. For example, new exclusion zone coordinates can be determined by mirroring the coordinates of an existing exclusion zone around a vertical or horizontal axis, to define a symmetrical pair of exclusion zones.

Exclusion zones may be defined such that they overlap with one another. For example, an exclusion zone may be defined to be a subset of another exclusion zone. By way of another example, exclusion zones may be defined such that the exclusion zones have overlapping portions and non-overlapping portions. An extent to which exclusion zones overlap with one another may be large or small (i.e., exclusion zones may overlap with one another to any extent). For example, exclusion zones may slightly overlap (e.g., a single pixel might be a member of more than one exclusion zone) or exclusions zones may overlap to a greater extent. Defining exclusion zones such that they overlap may help simplify configuring the exclusion zones. For example, if a shelf containing impulse-buy items (e.g., magazines and gum) is located within a larger area in which an operator's ID badge should be ignored, an ID-badge exclusion zone may be configured to ignore optical codes on ID badges and a subset of that exclusion zone may be configured to ignore optical codes of the impulse-buy items. An exclusion zone may contain more than one subset of exclusion zones (e.g., an ID-badge exclusion zone may be configured to ignore optical codes on ID badges, a first subset of the ID-badge exclusion zone may be configured to ignore optical codes of the impulse-buy items and a second subset of the ID-badge exclusion zone may be configured to ignore optical codes on bags of produce or deli items). In addition, multiple exclusion zones may overlap with each other (e.g., there may be multiple layers of overlapping exclusion zones). For example, a set of pixels may be members of more than two exclusion zones.

The image 200 and the exclusion zones may be larger or smaller and may take other shapes. Additionally, the exclusion zones may be defined in other ways, such as specifying an all inclusive portion of an image (e.g., a top half of the image, a full width of the image, or a narrow width of the image) as an exclusion zone, defining inclusion zones where optical codes are allowed to be read and accepted and treating all other areas as exclusion zones, or specifying one or more sub-regions (e.g., virtual scan lines) or one or more portions of a sub-region as an exclusion zone.

According to a preferred embodiment, a data reader is programmable so that one or more exclusion zones can be defined that correspond to a particular store layout. For example, a particular checkout lane might be configured with a point-of-sale display proximate the data reader (e.g., a rack containing impulse-buy items, such as magazines, gum, movies, and gift cards). If the data reader has an aggressive scan volume or read zone (or if the items are simply placed too close to the data reader), the items on the point-of-sale display may be read and accepted by the data reader (e.g., the customer may be charged for those items) even if the customer does not intend to purchase those items. Thus, the data reader may be programmed with one or more suitable exclusion zones corresponding to the area/volume of the point-of-sale display to avoid unintentionally reading those display items.

As will be described with reference to FIGS. 9 and 10, a data reader may be programmed or configured with one or more exclusion zones to selectively accept optical codes that appear within a scan volume of a data reader. For example, after a data reader is installed at a checkout lane, a training mode may be entered to program the data reader to ignore optical codes at certain locations within the scan volume, ignore optical codes of certain symbology types, or ignore optical codes have certain data encoded therein. With the data reader and surrounding optical codes (which may be unintentionally read and accepted) in the desired positions, the training mode may be enabled. While in the training mode, the data reader may decode the optical codes within the scan volume, record the locations within the scan volume of optical codes, and add the locations of the optical codes to an exclusion zone list. The user may be prompted to provide via a user interface an amount of optical code overlap with an exclusion zone that is required to reject the optical code. In addition, the user may be prompted to specify whether only optical codes with data matching the data read during the training mode should be rejected, whether only data with the same symbology types read during the training mode should be rejected, or whether any labels that appear in those locations (e.g., when a check-out clerk is scanning items to be purchased by a customer) should be rejected.

Exclusion zones may also be specified graphically by allowing the user to define, review, and edit the exclusion zones on a display. The display may show an actual image captured by the scanner being configured (e.g., via imager 130), including the position of surrounding objects, such as shelves or conveyers. If any exclusion zones have previously been defined, a position of those exclusion zones may be overlaid on the captured image. The user may then make a visual comparison of the exclusion zones to the surrounding objects to ensure that the exclusion zones correspond to the desired locations of the image (e.g., an exclusion zone corresponds to a point-of-sale display and another exclusion zone corresponds to a conveyer). The user may modify a location of an exclusion zone by selecting an edit function, which allows the user to edit parameters of the exclusion zone (e.g., a position of the exclusion zone, a shape of the exclusion zone, a size of the exclusion zone). The user may define new exclusion zones by selecting a define function and drawing/tracing an outline of an exclusion zone on the display (e.g., using an input device, such as a mouse or stylus). Additionally or alternatively, the user may select any number of points on the display corresponding an outer boundary of an exclusion zone. For example, the user may select three points to define vertices of a triangular-shaped exclusion zone (e.g., similar to exclusion zone 210), four points to define vertices of a rectangular-shaped exclusion zone (e.g., similar to exclusion zone 230) or a polygon-shaped exclusion zone (e.g., similar to exclusion zone 220), or five or more points to define vertices of an exclusion zone having another shape. The new exclusion zones may be overlaid on the captured image while the user is defining them or after the user has defined them. If desired, the user may modify a location of an exclusion zone by selecting an edit function. In addition, the user may define one or more exclusion parameters associated with an exclusion zone by selecting an edit function and providing an indication of which exclusion zone to edit. For example, the user may be prompted to define a position of an optical code relative to the exclusion zone necessary to reject the optical code, a position of the optical code within the depth of field of the data reader necessary to reject the optical code, a symbology type of optical codes to be rejected, and optical codes to reject based on data content of the optical code.

Alternately, instead of showing an actual image captured by the data reader (e.g., via imager 130), the display may show a more generic field of view or generic scene and the user may define, review, and edit exclusion zones as previously described. Even though the displayed field of view is more generic, the displayed field of view may help the user define the size and shape of the exclusion zone relative to the field of view. The display and user input device can be part of the data reader, or can be associated with an external device such as a personal computer, a personal digital assistant (PDA), or smart phone. If an external device is used, the graphical exclusion zone configuration can be performed while the external device is in communication with the data reader, or the exclusion zone definitions may be communicated from the external device to one or more data readers at some later point. Exclusion zone information may also be sent from the data reader to an external device, for storage, and possible copying to other data readers. The communication between the data reader and the external device may be wired or wireless, and may transmit data though any suitable digital communication medium including short distance networks, such as personal area networks, and long distance networks, such as the Internet.

For laser based scanners, the exclusion zones may be defined with respect to one or more portions of a scan pattern generated by the laser based scanner. For example, with respect to the scan pattern 1564 (FIG. 15), one or more of the scan lines 1562 or one or more portions of any of the scan lines may be classified as an exclusion zone. The location of an optical code with respect to an exclusion zone may be determined by associating optical code data detected by a scanning beam with a location of the scanning beam within the scan pattern as the scanning beam traverses the scan pattern. Further, exclusion zones may be specified in terms of the coordinates of the exclusion zone on a planar projection of the scan pattern (similar to the scan pattern 1562 shown in FIG. 15). The coordinates of the exclusion zone on a planar projection of the scan pattern may then be converted to a list specifying applicable scan lines, portions of scan lines, or both. The conversion may be done within the data reader or externally, such as by using data reader configuration software running on an external device, such as a personal computer, PDA, cash register, host, or smart phone. Specifying exclusion zones in terms of the coordinates of the exclusion zone on a planar projection of the scan pattern allows laser based scanner exclusion zones to be specified using methods similar to those described above with reference to imaging based scanners. For example, the user could specify an exclusion zone that excludes one quarter of the left side of the scan volume and the exclusion zone could then be converted into a list of the affected scan lines, portions of scan lines, or both.

Any number of conditions of an optical code may determine whether to accept or exclude the optical code (e.g., whether the decoded optical code data will be accepted by the data reader), such as the optical code's position relative to an exclusion zone (or a position of the scan data or image data corresponding to the optical code). For example, with reference to FIG. 3, an exclusion zone 310 is illustrated relative to an example captured image 300. Because optical code 320 falls completely outside of the exclusion zone 310, the optical code 320 will be accepted by the data reader (e.g., decoded data corresponding to the optical code 320 will be accepted by the data reader). In contrast, because optical code 330 falls completely inside of the exclusion zone 310, the optical code 330 (which may be associated with a shelf item, for example) will not be accepted by the data reader (e.g., decoded data corresponding to the optical code 330 will not be accepted by the data reader).

Optical codes or decoded data corresponding to optical codes lying partially in an exclusion zone may or may not be accepted by the data reader depending on the configuration of the exclusion zone. For example, the exclusion zone 310 may be configured to prevent reading shelf items located proximate a far limit of the depth of field associated with the imager that captured the example image 300. Thus, it may be desirable not to read/accept an optical code that lies entirely within the exclusion zone 310, such as optical code 330. However, if the customer wants to purchase one of the shelf items and the operator places the optical code associated with the shelf item proximate a near limit of the depth of field, the optical code would appear larger and occupy more of the captured image 300, as illustrated by optical code 340. Thus, even though the optical code 340 is partially within the exclusion zone 310, the optical code 340 will be accepted by the data reader (e.g., decoded data corresponding to the optical code 340 will be accepted by the data reader).

A determination of whether to accept an optical code (or decoded data corresponding to the optical code) lying partially in an exclusion zone may be made based on one or more of the following criteria or conditions, or variations thereof. For example, an exclusion zone may be configured such that the optical code will be accepted if any portion of an optical code is positioned outside of the exclusion zone (e.g., optical code 350). By way of another example, an exclusion zone may be configured such that the optical code will not be accepted if a centroid of an optical code is positioned inside of the exclusion zone (e.g., centroid 362 of optical code 360). By way of still another example, an exclusion zone may be configured such that the optical code will not be accepted if any portion of an optical code is positioned inside of the exclusion zone (e.g., optical code 370).

In addition to or as an alternative to configuring an exclusion zone to accept or reject an optical code based on a location of the optical code relative to an exclusion zone (see, e.g., FIGS. 2 and 3), exclusion zones may also be configured to accept or exclude optical codes based on a position of the optical code in a depth of field of an imager (e.g., if a distance of the optical code from the imager exceeds a predetermined distance). For example, it may be desirable to accept decoded data corresponding to an optical code located proximate a near limit of a depth of field of an imager (e.g., an optical code swept past the window of a data reader), but not decoded data corresponding to an optical code located proximate a far limit of a depth of field of the imager (e.g., optical codes on shelf items or an optical code on an operator's ID badge). Thus, an optical code may need to be of a certain size (e.g., relative to the overall size of the image) before decoded data associated with the optical code is accepted by the data reader. For example, with reference to FIGS. 1 and 4, as an object with optical code 410 thereon is moved from a position proximate a far limit of the depth of field (e.g., optical code 410F) to a position proximate a near limit of the depth of field (e.g., optical code 410N), the size of the optical code 410 relative to the overall size of the image will increase (assuming that the optical magnification of the imager does not change). Thus, data associated with an optical code positioned proximate a near limit of the depth of field (e.g., the optical code 410N) may be accepted by the data reader, but not data associated with an optical code positioned proximate a far limit of the depth of field (e.g., the optical code 410F).

The location within the depth of field may be determined in several ways, such as using a rangefinder (e.g., a laser rangefinder, microwave rangefinder, or ultrasonic rangefinder) or comparing a size of the optical code to a threshold size. The threshold size may be based on the symbology and an overall size of a field of view at a certain distance from the lens assembly (e.g., the far focus limit of the depth of field). For example, with reference to FIG. 4, the threshold may comprise a minimum number of pixels of the optical code (e.g., between start and stop characters, between the top and bottom of the optical code, or an overall area of the optical code). The location within the depth of field may be determined based on apparent width of elements within an optical code (e.g., a number of pixels per narrow element). For example, an optical code having many pixels per bar or space is likely closer to the data reader than an optical code having a few pixels per bar or space. Using apparent width of elements within an optical code should provide an estimate of distance even for optical codes with varying number of bars and spaces in a code symbol, where the apparent size of the optical code may vary due to a different number of encoded data characters rather than a difference in location within the depth of field. The allowable range of element widths may be known in advance, allowing for a better inference of actual distance based on the apparent element size.

The location within the depth of field may also be determined in other ways, such as by using the distance determination techniques described in U.S. Pat. No. 7,137,555 and International Publication No. WO 01/29576 A1, both of which are hereby incorporated by reference in their entireties. U.S. Pat. No. 7,137,555 describes a proximity detector that uses an illumination source to project light at an object and a photodetector to detect the light reflected by the object. If the object is near, the amount of reflected light will be relatively large, and an amplifier output will exceed a preset threshold. If the object is far away, on the other hand, the amount of reflected light detected by the photodetector will be smaller, and will not exceed the preset threshold. International Publication No. WO 01/29576 A1 describes two or more photodetectors positioned at a detector plane, with one of the photodetectors aligned with an optical axis, and the other photodetector (if one) adjacent thereto or (if several) arranged in a linear sequence emanating outward from the center photodetector. If the object is distant, all or most of the collected light is focused on the center photodetector. As the target approaches a lens of the light collection system, the spot spread increases and more light is focused on the side detector (s) and less on the center photodetector.

If multiple exclusion zones are defined for the data reader (e.g., exclusion zones 210, 220, and 230 of FIG. 2), each exclusion zone may have its own exclusion parameters associated therewith, such as an overall size of the exclusion zone, a location of the exclusion zone within scan volume, a requisite position of the optical code relative to the exclusion zone, symbology types of optical codes to be excluded, and data content of optical codes to be excluded. In other words, each exclusion zone may be of a certain type. For example, a type 1 exclusion zone may be configured to not read and accept optical codes if the entire optical code is within the exclusion zone, a type 2 exclusion zone may be configured to not read and accept optical codes if a centroid of an optical code is within the exclusion zone, and a type 3 exclusion zone may be configured to not read and accept optical codes if any portion of an optical code is within the exclusion zone. The various types of exclusion zones may also be based on symbology types and data content of optical codes, such as defining which symbology types and data content should be excluded or accepted (e.g., a type 1 exclusion zone may not read and accept any symbologies while a type 2 exclusion zone may not read and accept UPC optical codes).

Figure 5:
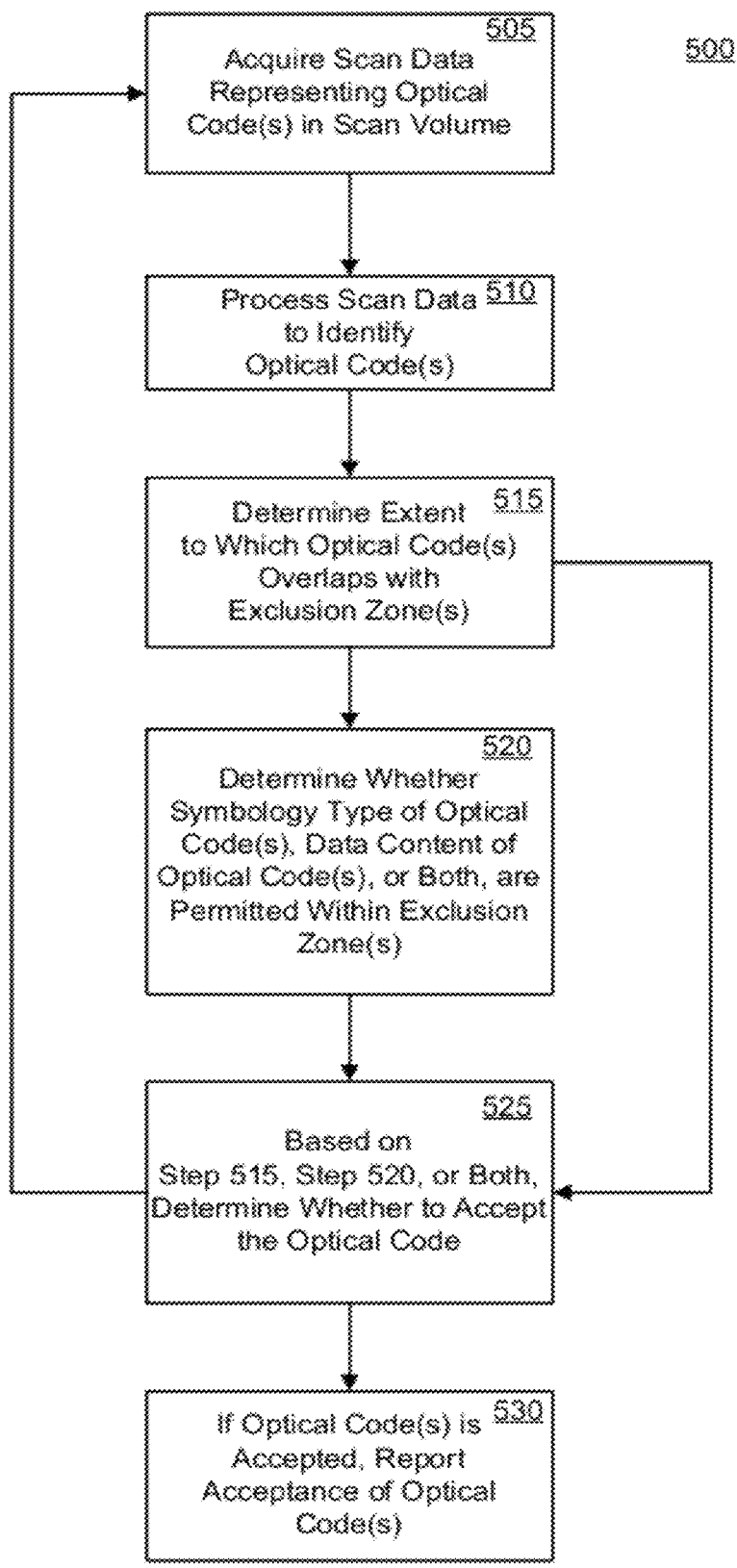
FIG. 5 is a flowchart illustrating a method of selectively reading and accepting optical codes within a scan volume of a data reader, according to one embodiment.
Figure 6:
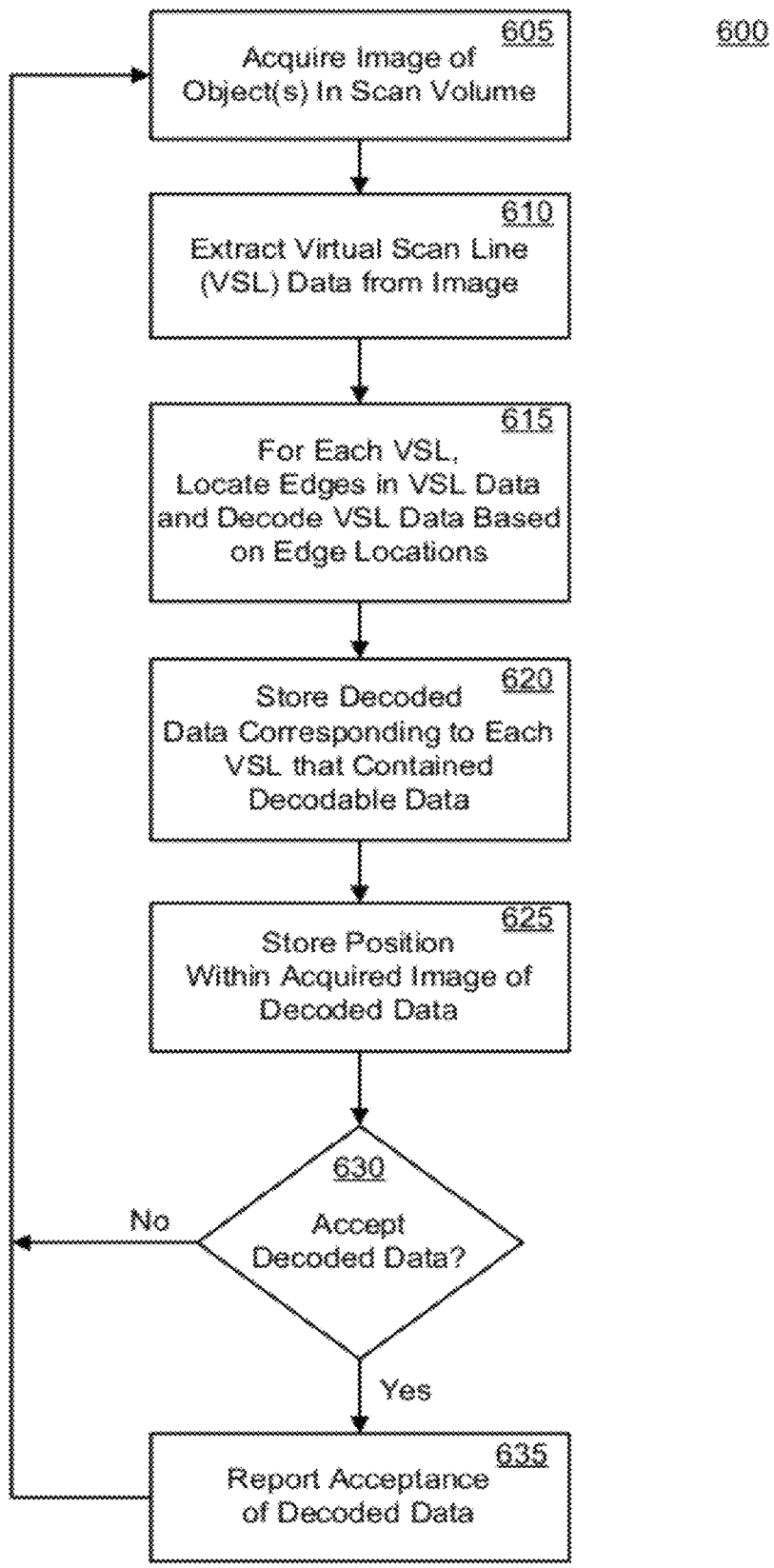
FIG. 6 is a flowchart illustrating a method of selectively reading and accepting optical codes using an imaging based scanner, according to one embodiment.
Figure 7:
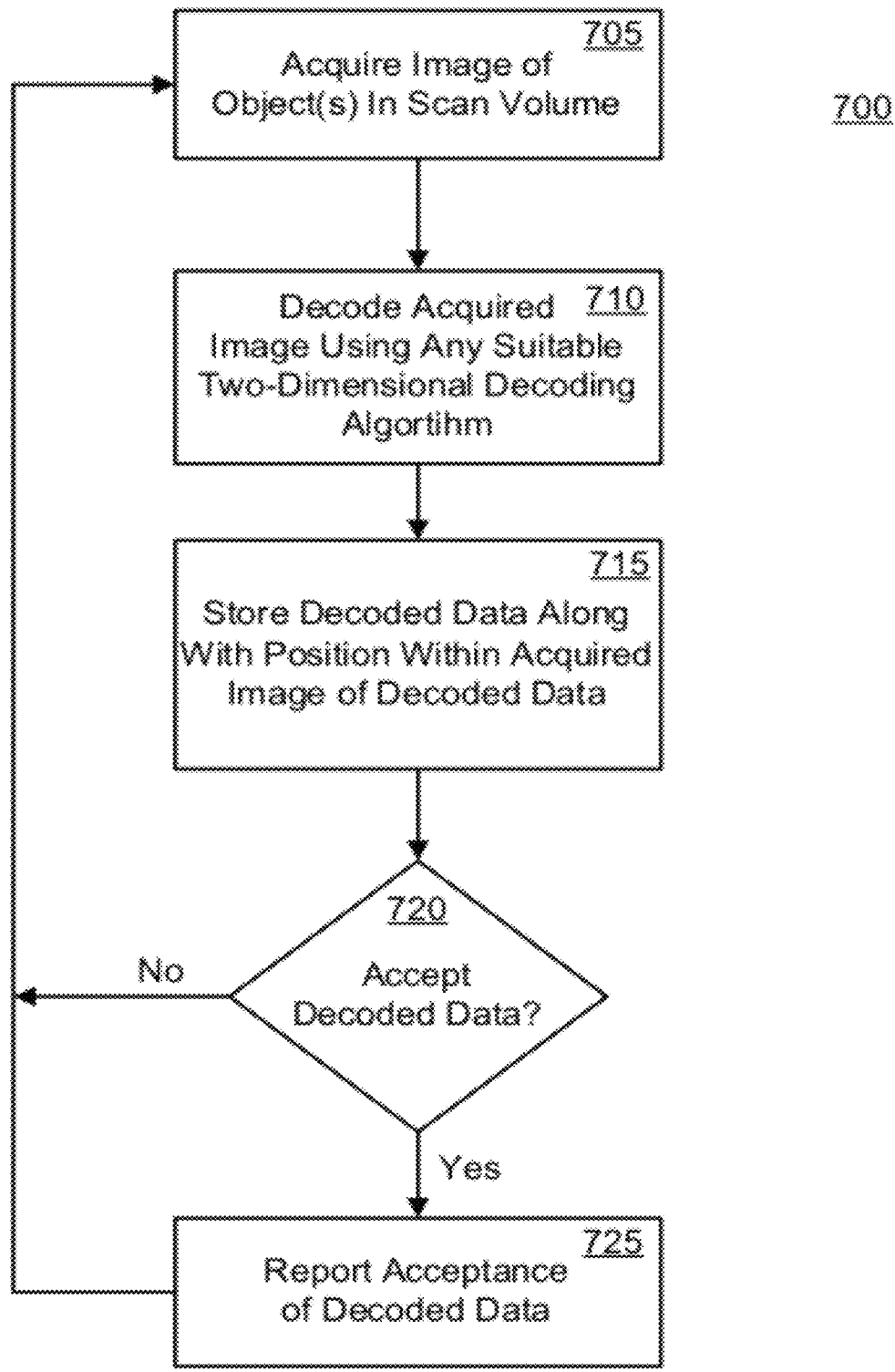
FIG. 7 is a flowchart illustrating a method of selectively reading and accepting optical codes using an imaging based scanner, according to another embodiment.
Figure 8:
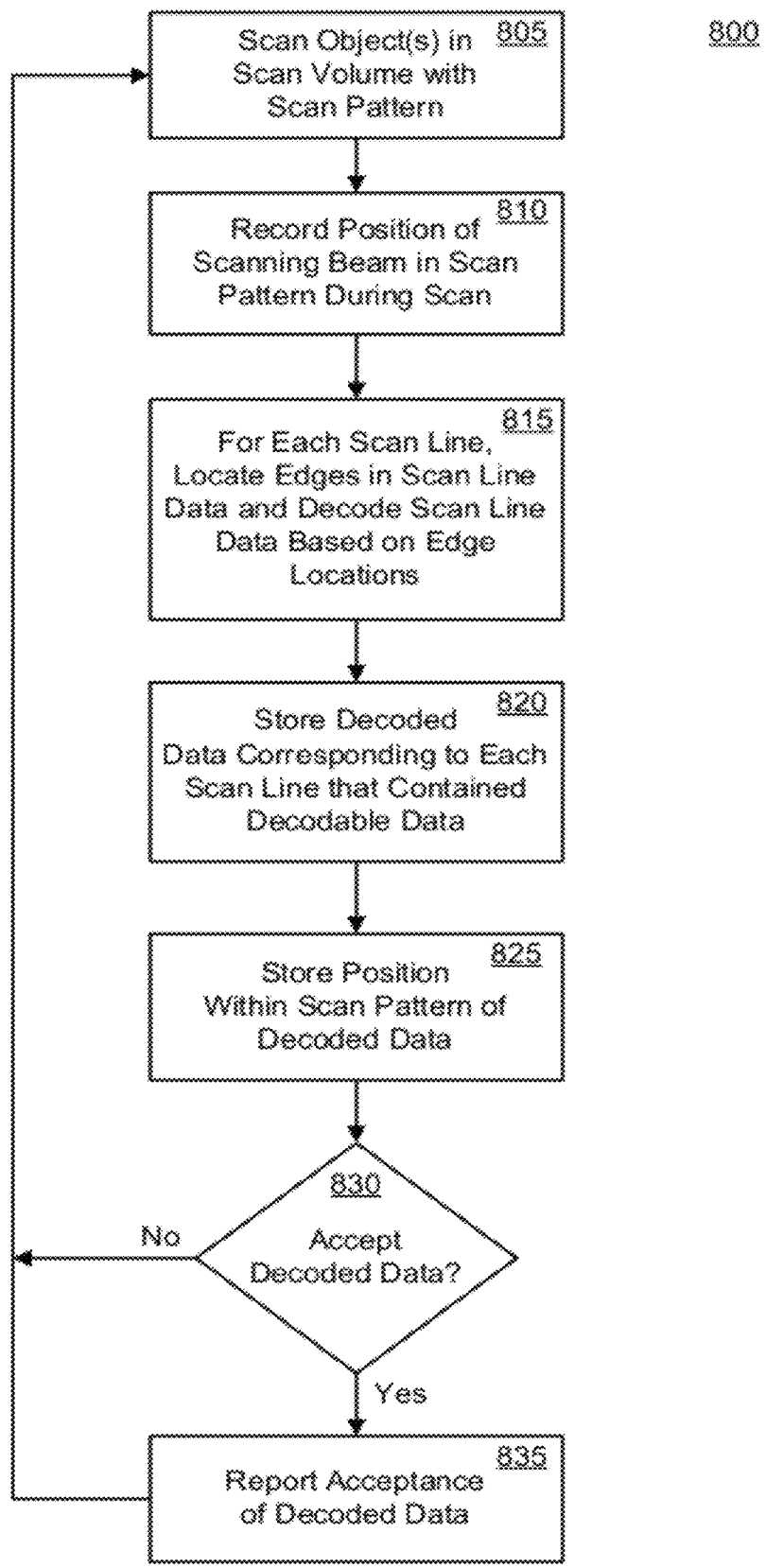
FIG. 8 is a flowchart illustrating a method of selectively reading and accepting optical codes using a laser based scanner, according to one embodiment.

FIG. 5 is a flowchart illustrating a method 500 of selectively reading and accepting optical codes within a scan volume of a data reader, according to one embodiment. The method 500 is applicable to a data reader regardless of whether the data reader incorporates an imaging based scanner, a laser based scanner, or both. FIGS. 6, 7, and 8 present flowcharts of various examples of selectively reading and accepting optical codes using imaging based scanners and laser based scanners.

At step 505, scan data including an image or scan of an optical code located within the scan volume of the data reader is acquired or received. The scan data may comprise source data corresponding to a scan region or read region of the data reader, such as image data or pixel data from an acquired image of the scan region or read region (e.g., example image 200 or 300) or scan data from a laser based scanning system. In other words, the scan data represents light reflected from one or more objects (which may bear an optical code) within a scan volume of a data reader. For example, for an imaging based scanner, one or more images of an object (e.g., with an optical code thereon) can be acquired after an operator presents the object to a window of the data reader (or sweeps the object past the window or vice versa). For a laser based scanner, the data reader may sweep a scanning beam across the object (e.g., in a scan pattern) and direct light reflected by the object towards a photodetector for conversion into data indicative of the incident light. The scan volume preferably has associated therewith a configurable exclusion zone that includes a first exclusion parameter defining a minimum amount of optical code overlap with the exclusion zone required to reject the optical code.

At step 510, the scan data is processed to determine whether the acquired or received data (or any portion thereof) contains decodable data corresponding to one or more optical codes. In other words, the scan data is processed to determine whether the scan data contains any optical codes. Any suitable technique can be used to identify decodable data. For example, for an imaging based scanner, pixel data corresponding to one or more sub-regions (e.g., virtual scan lines) of the image acquired at step 505 is processed to locate edge transitions and to attempt to decode the pixel data based on the edge transition locations (e.g., using a low level decoder, a high level decoder, or both). By way of another example, for an imaging based scanner, a two-dimensional decoding algorithm may be used to determine whether the scan data contains decodable data corresponding to an optical code. For a laser based scanner, data corresponding to each scan line in the scan pattern may be processed to locate edge transitions and to attempt to decode the scan line data based on the edge transition locations. The scan data may or may not be decoded at step 510. For example, the scan data may be processed to determine whether the scan data contains or is likely to contain decodable data, such as when the relative locations of edge transitions and spaces therebetween yield at least one valid character, codeword, or overhead character, or when a minimum number of edge transitions are detected.

According to one embodiment, a subset of the scan data is not processed to determine whether the scan data contains decodable data (e.g., a subset of the scan data that corresponds to one or more of the exclusion zones is not processed). Thus, a decoder may determine a position of each exclusion zone and not decode scan data within one or more of the exclusion zones.

At step 515, an extent to which an optical code overlaps with the exclusion zone is determined so that it can be determined whether the amount of optical code overlap with the exclusion zone meets or exceeds the minimum amount of optical code overlap defined by the first exclusion parameter. If there are multiple exclusion zones within the scan volume, an extent to which the optical code overlaps with each of the exclusion zones may be determined. If multiple optical codes are identified in the scan data, an extent to which each optical code overlaps with the exclusion zone (or each exclusion zone if there are multiple exclusion zones) may be determined. According to one embodiment, step 515 includes determining a position of each optical code within the scan volume and comparing the position within the scan volume of each optical code to the position within the scan volume of each exclusion zone. In other words, a position within the scan volume of the scan data or source data corresponding to the optical code (e.g., decodable data corresponding to the optical code) may be compared to a position within the scan volume of an exclusion zone. For example, for an imaging based scanner, a pixel location within the captured image corresponding to the beginning and end of each optical code may be determined, such as by determining the location of start and stop characters, and compared to a location of each exclusion zone. By way of another example, a location within an image frame of a sub-region (e.g., virtual scan line) segment that contains pixel data resulting in decoded data may be determined and compared to a position of each exclusion zone. For a laser based scanner, a location within the scan pattern corresponding to the beginning and end of the optical code may be determined. Additionally, a position of each optical code within a depth of field of the data reader may be determined according to any of the methods previously described, such as, for example, comparing the size of the optical code (e.g., a distance between the beginning and end of the optical code) to the overall size of the captured image.

A position of all or a portion of the scan data corresponding to each optical code may optionally be stored along with the decoded data after decoding (e.g., the position may be stored as an output of a decoder). For example, the position of each decoded character, such as a pixel location or range of pixel locations within the captured image or a position with the scan pattern, may be stored along with the decoded character after decoding using a suitable decoding technique. By way of another example, the position of scan data that is likely to contain decodable data, such as a pixel location or range of pixel locations within the captured image or a position with the scan pattern, may be stored after determining that the scan data is likely to contain decodable data. Thus, the position of each optical code within the scan volume may be determined as the scan data is processed for optical codes (e.g., at the same time as step 510).

At step 525, a determination of whether to accept or reject the optical code(s) (or the decodable data corresponding to the optical code(s)) is made based on the outcome of step 515. For example, if the extent to which an optical code overlaps with an exclusion zone does not meet or exceed a minimum amount of optical code overlap defined by the first exclusion parameter, the optical code may be accepted. In other words, the determination of whether to accept or reject an optical code may be made based on a position within the scan volume of the optical code relative to the configurable exclusion zone. With reference to FIG. 2, scan data associated with an optical code bound by a rectangle having coordinates (400,100), (400,200), (640,200), and (640,100) may be accepted by the data reader because the optical code does not fall within any of the exclusion zones 210, 220, and 230 (assuming the exclusion zones 210, 220, and 230 have the same example coordinates described with reference to FIG. 2). However, if the optical code is shifted 100 pixels to the left (i.e., bound by a rectangle having coordinates (300,100), (300,200), (540,200), and (540,100)), the optical coded may be rejected (e.g., not be accepted) by the data reader because at least a portion of the optical code is located within the exclusion zone 230. In other words, even though the optical code reader is capable of reading and accepting the optical code, the optical code is rejected or ignored by the data reader. The scan data corresponding to an optical code may be decoded (e.g., by any suitable decoder) before, during, or after step 525.

If the scan volume has associated therewith overlapping exclusion zones, a determination of whether to accept or reject an optical code may be based on overlap rules defined for the overlapping exclusion zones. For example, if an exclusion zone is defined as a subset of another exclusion zone one or more overlap rules may define whether to accept or reject an optical code. After independently determining whether the optical code should be accepted or rejected based on the exclusion parameters associated with each zone, the overlap rules defined for the set of overlapping exclusion zones may be checked to determine whether to accept or reject the optical code. For example, the overlap rules may be configured to accept the optical code if either exclusion zone would accept it (e.g., a logical "or" condition). By way of another example, the overlap rules may be configured to accept the optical code only if all zones would accept it (e.g., a logical "and" condition). The overlap rules may also be defined to accommodate more than two layers of overlapping exclusion zones. Although it may be possible to define a collection of non-overlapping exclusion zones that together provide the same functionality of the overlapping exclusion zones, utilizing overlapping exclusion zones may simplify defining the exclusion zones, such as in the case of a shelf containing some items which should be ignored, which is within a larger area where the operator's ID badge should be ignored.

The determination of whether to accept the optical code at step 525 depends on the exclusion parameters associated with the exclusion zone. For example, if the exclusion zone 230 is configured to be a type 1 exclusion zone (e.g., optical codes are read and accepted unless the entire optical code is within the exclusion zone), an optical code bound by a rectangle having coordinates (300,100), (300,200), (540,200), and (540,100) is read and accepted because the entire optical code does not fall within the exclusion zone 230. However, if the exclusion zone 230 is configured to be a type 3 exclusion zone (e.g., optical codes are not read and accepted if any portion of the optical code is within the exclusion zone), the optical code having the same coordinates is not read and accepted because a portion of the optical code falls within the exclusion zone 230. If the exclusion zone 230 is configured to be a type 2 exclusion zone (e.g., optical codes are not read and accepted if a centroid of an optical code is within the exclusion zone), the optical code is read and accepted unless a central portion is located within the exclusion zone 230. In addition, or alternatively, the determination of whether to accept the decoded optical code data at step 525 may depend on a position of the optical code in a depth of field of the data reader as previously described with reference to FIG. 4.

Optionally, a determination of whether the symbology type of the optical code (e.g., UPC, Code 39, Code 128, Data Matrix, or PDF417), the data encoded in the optical code, or both, are permitted within an exclusion zone is made at step 520. Then, based on step 520, a determination of whether to accept the optical code is made at step 525. For example, with reference to FIG. 2, the data reader may be configured not to accept any optical codes at least partially within the exclusion zone 210 and to accept only optical codes of certain symbology types (e.g., UPC) that are at least partially within the exclusion zone 230. Thus, a UPC optical code at least partially within the exclusion zone 230 would be read and accepted, but not a UPC optical code at least partially within the exclusion zone 210. Similarly, a UPC optical code at least partially within the exclusion zone 230 would be read and accepted, but not a PDF417 optical code at least partially within the exclusion zone 230.

By way of another example, with reference to FIG. 2, the data reader may be configured not to accept optical codes containing certain classes of data, such as optical codes associated with random weight items, that are at least partially within the exclusion zone 210 (e.g., the exclusion zone corresponding to the conveyor 150 of FIG. 1) so that the data reader does not accept optical codes on bags of produce or deli items while on the conveyor 150. In other words, the data reader may be configured to accept optical codes of every symbology type that are at least partially within the exclusion zone 210 unless the optical code contains data indicative of a random weight item. In the case of certain UPC optical codes having GS1 prefix values of 02 and 20 through 29 (which are used for variable measure items), the price or weight of the item may be encoded in the optical code (e.g., an optical code including the price of the item may be generated for the item at a deli counter based on the item's weight). Thus, it may not be necessary to send data encoded in the optical code (e.g., a manufacturer identification number and an item number) to a host to determine the price of the item. Instead, the data reader may determine the price of the item itself by decoding the price data encoded in the optical code. Accordingly, a data reader may be configured to determine whether an optical code that is at least partially within the exclusion zone 210 has a random-weight-item number-system-character encoded therein (e.g., a "2" in the first digit of a UPC A optical code). If so, the data reader may not accept the decoded optical code data at step 525. By way of yet another example, the data reader may be configured not to accept optical codes containing certain classes of data that are at least partially within an exclusion zone, such as optical codes associated with periodical items (e.g., magazines) to facilitate avoiding unintended reading of periodicals on a rack within the scan volume. Thus, a data reader may be configured to determine whether an optical code that is at least partially within an exclusion zone has a periodical number-system-character encoded therein (e.g., a UPC optical code containing a GS1 prefix of 977). By way of still another example, the data reader may be configured not to accept optical codes based on a data content of the optical code, such as predefined data values. The data reader may further be configured not to accept optical codes having predefined data values that appear in a particular character-position of the optical code.

According to a preferred embodiment, the determination of whether to accept the decoded optical code data at step 525 does not rely on projecting an aiming pattern into a scan region and is made without regard to whether an aiming pattern intersects the optical code. U.S. Patent Publication No. 2006/0081712, which is hereby incorporated by reference in its entirety, discloses a system and method for optical code reading that includes projecting an aiming pattern into a scan region, determining if the aiming pattern intersects the optical code, and if so, acknowledging and transmitting data acquired from the optical code. The aiming pattern helps the user in locating the barcode on an item at an optimum position relative to the scanner. The aiming pattern may be generated by a separate light source than the system's illumination source, such as LED, laser diode, halogen, broad band or white light source, or any suitable visible light.

If a determination is made at step 525 to accept the optical code, the data reader may report the acceptance of the optical code at step 530. Additionally, if the scan data corresponding to an optical code has not yet been decoded, the scan data corresponding to an optical code may be decoded (e.g., by any suitable decoder). For example, the data reader may transmit the accepted decoded optical code data to the host 1197 (see FIG. 11) or another device (e.g., a computer, a point-of-sale terminal, a point-of-sale computer system, or a cash register). The transmission may be performed in a point-to-point manner or may be broadcast over a wired or wireless network. The host (or another device) may present data, prompts, and otherwise communicate with the user via one or more display devices. For example, the host (or another device) may present the decoded data to the user via a display, such as the object type (e.g., product type) corresponding to the scanned optical code and data associated with the object type (e.g., a price of the product). The data associated with the object type may be encoded in the optical code or accessed from a local or remote database based upon the object type. By way of another example, the host (or another device) may cause the decoded data to be recorded on a tangible medium. For example, the host (or another device) may instruct a printer to print the object type and data corresponding to the object type (e.g., print the product type and associated price on a receipt).

The data reader may also store the accepted decoded optical code data in memory 1160 (see FIG. 11), memory 1170, or both. For example, if the data reader is operating in a portable mode or the host is unavailable, the accepted data may be buffered in the data reader for later transmission in a batch mode. Additionally, the data reader may acknowledge that decoded optical code data has been accepted, such as by sounding a beep customarily associated with data readers. If a determination is made to reject the decoded optical code data at step 530, the data reader may optionally report the rejection of the optical code or store an indication of which optical codes were not accepted.

FIG. 6 is a flowchart illustrating a method 600 of selectively reading optical codes using an imaging based scanner, according to one embodiment. At step 605, an image of one or more objects within a scan volume of a data reader is acquired. For example, after an operator presents an object to a window of the data reader (or sweeps the object past the window or vice versa), one or more images of the object (e.g., with an optical code thereon) can be captured.

At step 610, all or a portion of the image data may be extracted from the acquired image and stored in memory (e.g., an image buffer). For example, a sub-region extraction module (e.g., sub-region extraction module 1310 of FIG. 13) may extract pixel data corresponding to one or more sub-regions (e.g., virtual scan lines) from an acquired image and store the extracted data in a reserved segment of memory used to hold data while the data is being processed. Alternatively, pixel data corresponding to one or more sub-regions (e.g., virtual scan lines) may be extracted from an incoming video stream and processed (with or without storing the extracted pixel data).

At step 615, the extracted data is processed to determine whether the extracted data (or any portion thereof) contains decodable data corresponding to one or more optical codes. For example, an edge detection module (e.g., edge detection module 1320 of FIG. 13) may process the pixel data corresponding to each sub-region (for which pixel data was extracted at step 610) to locate edge transitions and one or more decoders (e.g., a low level decoder, a high level decoder, or both) may attempt to decode the extracted pixel data based on the edge transition locations.

If any of the sub-regions contain decodable data, the decodable data may be decoded and the decoded data (e.g., from the decoders 1330 of FIG. 13) may be stored at step 620 along with a position within the image that contained decoded data at step 625. The position of the decoded data within the image may be specified in several ways, such as storing a position of the sub-region (or portion thereof) that contained the decodable data (e.g., a location within an image frame of a sub-region segment, such as a virtual scan line segment, that contains pixel data resulting in decoded data may be determined and stored) or storing a position of each decoded character. For example, with reference to FIG. 14, sub-regions VSL3, VSL4, and VSL5 should contain decodable data corresponding to optical code 1220. Thus, a portion of the decoded data associated with the optical code 1220 may be stored along with an indication that the sub-region (VSL3) corresponding to a line extending between coordinates (0,1023) and (1279,0) contained the respective decodable data (assuming the raster 1400 represents a 1280×1024 image and the origin of the coordinate system is located in the upper-left portion of the image). Similarly, because sub-regions VSL4 and VSL5 should also contain decodable data, the decoded data associated with the optical code 1220 may also be stored along with an indication that the sub-region (VSL4) corresponding to a line extending between coordinates (320,1023) and (960,0) and the sub-region (VSL5) corresponding to a line extending between coordinates (640, 1023) and (640,0) contained the respective decodable data.

The position of the decoded data within the image may be specified in a more specific manner, such as a portion of the sub-region that contained the decodable data. For example, the decoded data associated with the optical code 1220 may also be stored along with an indication that the sub-region (VSL5) corresponding to a line extending between coordinates (640,512) and (640,0) contained the respective decodable data. Additionally, a pixel location or range of pixel locations associated with each decoded character may be stored.

At step 630, a determination of whether to accept the decoded data is made (e.g., a determination of whether to accept the optical code is made). For example, the position of each optical code within the scan volume (e.g., the position of the sub-region or portion of the sub-region that contained the decodable data or the position of each decoded character) may be compared to a position of each exclusion zone to determine whether to accept the decoded data as previously described with reference to steps 515 through 530 of FIG. 5. In addition, or alternatively, the determination of whether to accept or reject the decoded data may be based on other conditions of the optical code, such as a position of the optical code within the depth of field of the data reader, a symbology type of the optical code, and data encoded in the optical code. If the optical code is not within an exclusion zone or is appropriately positioned relative to each exclusion zone (as defined by exclusion zone parameters associated with each exclusion zone), the acceptance of the decoded data associated with the optical code may optionally be reported at step 635 (e.g., transmitted to the host) and steps 605 through 630 may be repeated again for another acquired image (or method 600 may end).

FIG. 7 is a flowchart illustrating a method 700 of selectively reading and accepting optical codes using an imaging based scanner, according to another embodiment. At step 705, an image of one or more objects within a scan volume of a data reader is captured. For example, after an operator presents an object to a window of the data reader (or sweeps the object past the window or vice versa), one or more images of the object (e.g., with an optical code thereon) can be acquired.

At step 710, image data corresponding to the acquired image is processed using a suitable two-dimensional decoding algorithm to determine whether the image data contains decodable data corresponding to one or more optical codes. Any suitable two-dimensional decoding algorithm may be used that processes the image data to identify and possibly decode any optical codes within the acquired image and report a position of each optical code within the acquired image. For example, a two-dimensional decoding algorithm may be implemented by an edge detection module (e.g., edge detection module 1320 of FIG. 13) and may process the image data in a brute-force manner to locate edge transitions and decode the image data based on the edge transition locations. The edge detection module may locate edge transitions in the image data by comparing a pixel value of one pixel to a pixel value of one or more adjacent pixels, starting in the upper-left corner of the acquired image and moving to the right one pixel at a time. Upon reaching the right-most pixel, the edge detection module may move down one row and continue comparing adjacent pixels moving to the left one pixel at a time. Upon reaching the left-most pixel, the edge detection module may move down another row and repeat the pixel comparisons in a serpentine like manner until reaching the lower-right corner of the acquired image. One possible pixel classification rule is to classify a pixel as an edge location if the absolute value of the difference between the pixel under consideration and an adjacent pixel (e.g., a pixel to its right or the pixel below it) exceeds a threshold value. At the same time (or after the edge transition locations have been identified), one or more decoders (e.g., a low level decoder, a high level decoder, or both) may attempt to decode the image data based on the edge transition locations. After decoding an optical code, the two-dimensional decoding algorithm outputs a position within the acquired image of the decoded data (e.g., the optical code is bound by a box or rectangle having certain pixel coordinates within the image). Many variations of two-dimensional decoding algorithms are possible. For example, the two-dimensional decoding algorithm may process the image data in other orientations, such as any combination of top-to-bottom, bottom-to-top, left-to-right, right-to-left, and diagonally. Additionally, two-dimensional decodings algorithm may process the image data from an image buffer or an incoming video stream.

For the purposes of the method 700, any suitable two-dimensional decoding algorithm may be used at step 710. Preferably, the two-dimensional decoding algorithm is configured to process the image data to identify (and optionally decode) optical codes within the acquired image and output a position of each optical code within the acquired image. Additional details regarding two-dimensional decoding algorithms and example two-dimensional decoding algorithms can be found in international standards associated with symbology types, such as ISO/IEC 16022:2006, entitled "Information technology—Automatic identification and data capture techniques—Data Matrix bar code symbology specification", available from the International Organization for Standardization (ISO) or Geneva, Switzerland.

At step 715, the decoded data corresponding to each optical code is stored along with a position within the image that contained decoded data. For example, with reference to FIG. 2, an optical code may be positioned proximate the upper-center portion of example image 200. Thus, the decoded data associated with the optical code may be stored along with an indication that the decoded data is bound by a rectangle having coordinates (400,100), (400,200), (640,200), and (640,100).

At step 720, a determination is made of whether to accept the decoded data associated with each optical code (e.g., a determination of whether to accept each optical code is made). For example, the position of each optical code within the scan volume (e.g., the position of the sub-region or portion of the sub-region that contained the decodable data or the position of each decoded character) may be compared to a position of each exclusion zone to determine whether to accept the decoded data as previously described with reference to steps 515 through 530 of FIG. 5. In addition, or alternatively, the determination of whether to accept or reject the decoded data may be based on other conditions of the optical code, such as a position of the optical code within the depth of field of the data reader, a symbology type of the optical code, and data encoded in the optical code. If the optical code is not within an exclusion zone or is appropriately positioned relative to each exclusion zone (as defined by exclusion zone parameters associated with each exclusion zone), the acceptance of the decoded data associated with the optical code may optionally be reported at step 725 (e.g., transmitted to the host) and steps 705 through 720 may be repeated again for another acquired image (or method 700 may end).

FIG. 8 is a flowchart illustrating a method 800 of selectively reading and accepting optical codes using a laser based scanner, according to one embodiment. At step 805, one or more objects within a scan volume of a data reader are scanned. For example, after an operator presents an object to a window of the data reader (or sweeps the object past the window or vice versa), the data reader may sweep a scanning beam across the object (e.g., in a scan pattern) and direct light reflected by the object towards a photodetector for conversion into data indicative of the incident light.

As the scanning beam is swept across the object, a position of the scanning beam within the scan pattern is recorded at step 810. For example, the laser based scanner may include a once-per-pattern sync signal and a timer. The sync signal may comprise a short pulse generated at the start of the scan pattern for resetting the timer. Thus, the position of the scanning beam within the scan pattern can be determined based on the timer value (assuming the scanning beam takes a fixed amount of time to trace the scan pattern). According to a preferred embodiment, the position of the scanning beam within the scan pattern is correlated with the decoded data (e.g., the pattern sync data may be supplied to a decoder). Thus, as will be described in more detail in steps 825 through 835, the position of each optical code can be compared to the position of each exclusion zone to determine whether to accept the decoded data associated with each optical code.

Figure 15:
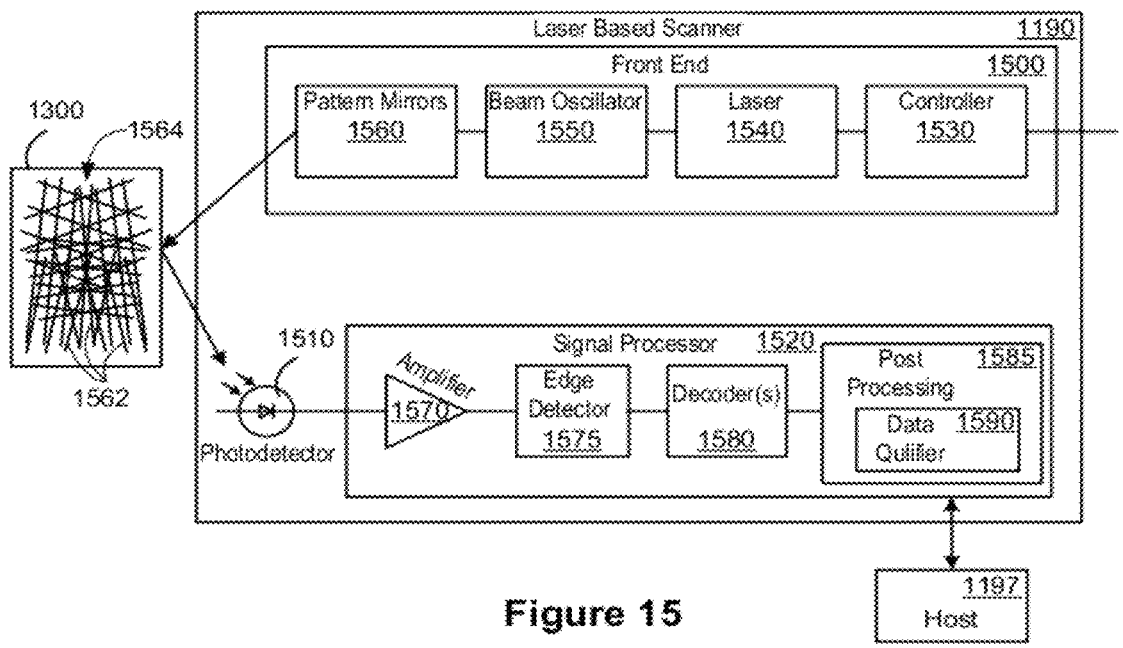
FIG. 15 is a block diagram of the laser based scanner of FIG. 11, according to one embodiment.

The position of the scanning beam within the scan pattern may also be determined and recorded in other ways, such as using an angular position encoder with the scanning mechanism (e.g., the beam deflector or oscillator 1550 of FIG. 15). A scanning oscillator which varies in period may be accommodated by measuring the time between successive sync signals, and calculating a position of the scanning beam as a ratio of the current timer value relative to the most recent full scan period (e.g., the time between sync signals), rather than with respect to a fixed time. The starting and ending points of each scan line in the scan pattern may also be expressed in terms of its relative timing within the scan period. Additionally, U.S. Pat. No. 4,792,666, which is hereby incorporated by reference in its entirety, describes coupling a scan mechanism of a laser scanner (e.g., a wheel that produces the scanning action) to a switching apparatus that changes the gain of a received signal amplifier in accordance with the position of the beam in the scanning sequence. A beginning position of the wheel can be detected photo-electrically and a shift from one scan line to another may be detected (e.g., by photo-electrically sensing the beam as it scans through dead spaces at the end of each scan) or timed (e.g., timing the cycle or sequence and dividing the rotation of the wheel into a fixed number of periods in accordance with the segment of time required for each scan line).

Further, U.S. Pat. No. 6,575,368, which is hereby incorporated by reference in its entirety, describes a mechanism for producing a signal that is synchronized with facet wheel rotation and can be used in conjunction with one or more timers to control functions that relate to facet wheel positions. For example, if the facet wheel is rotated by a DC brushless motor which produces a Hall output pulse six times for each motor revolution, a divide by six counter may generate a single pulse for each motor revolution that may be synchronized once to a known facet wheel position so that the Hall pulses may accurately maintain synchronization to facet wheel motion. By way of another example, a phase locked loop multiplier may be used to produce 6N pulses per revolution from the six Hall pulses along with a divide by 6N counter to produce one pulse per revolution that allows synchronization to the facet wheel position within $\frac{1}{6}$N of a revolution.

At step 815, the scan line data (e.g., data indicative of the light reflected by the object) is processed to determine whether the scan line data (or any portion thereof) contains decodable data corresponding to one or more optical codes. For example, an edge detection module (e.g., edge detection module 1575 of FIG. 15) may process the scan line data to locate edge transitions and one or more decoders may attempt to decode the scan line data based on the edge transition locations.

If any of the scan lines (e.g., scan lines 1562 of FIG. 15) contain decodable data, the decoded data is stored at step 820 along with a position within the scan pattern that contained decoded data at step 825. The position of the decoded data within the scan pattern may be specified in several ways, such as storing a timer value or angular position of each decoded character or a starting and ending timer value (or angular position) of the scan lines (or portions thereof) that contained the decodable data.

At step 830, a determination of whether to accept the decoded data is made (e.g., a determination of whether to accept the optical code is made). For example, the position of each optical code within the scan pattern or scan volume (e.g., the position of the scan line or portion of the scan line that contained the decodable data or the position of each decoded character) may be compared to a position of each exclusion zone to determine whether to accept the decoded data as previously described with reference to steps 515 through 530 of FIG. 5. In addition, or alternatively, the determination of whether to accept or reject the decoded data may be based on other conditions of the optical code, such as a position of the optical code within the depth of field of the data reader, a symbology type of the optical code, and data encoded in the optical code. If the optical code is not within an exclusion zone or is appropriately positioned relative to each exclusion zone (as defined by exclusion zone parameters associated with each exclusion zone), the acceptance of the decoded data associated with the optical code may optionally be reported at step 835 (e.g., transmitted to the host) and steps 805 through 830 may be repeated again (or method 800 may end).

Figure 9:
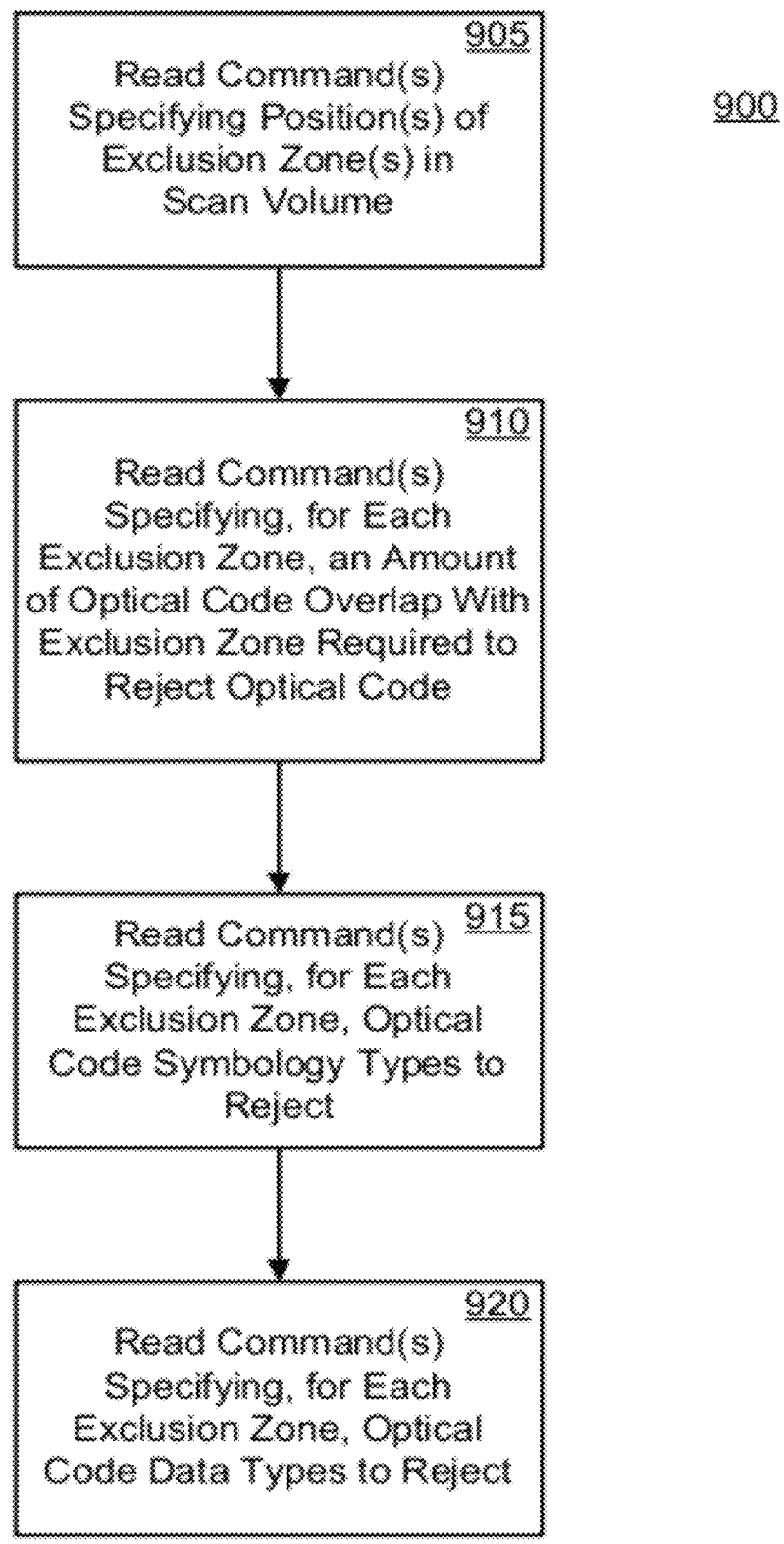
FIG. 9 is a flowchart illustrating a method of configuring a data reader to selectively read and accept optical codes, according to one embodiment.
Figure 10:
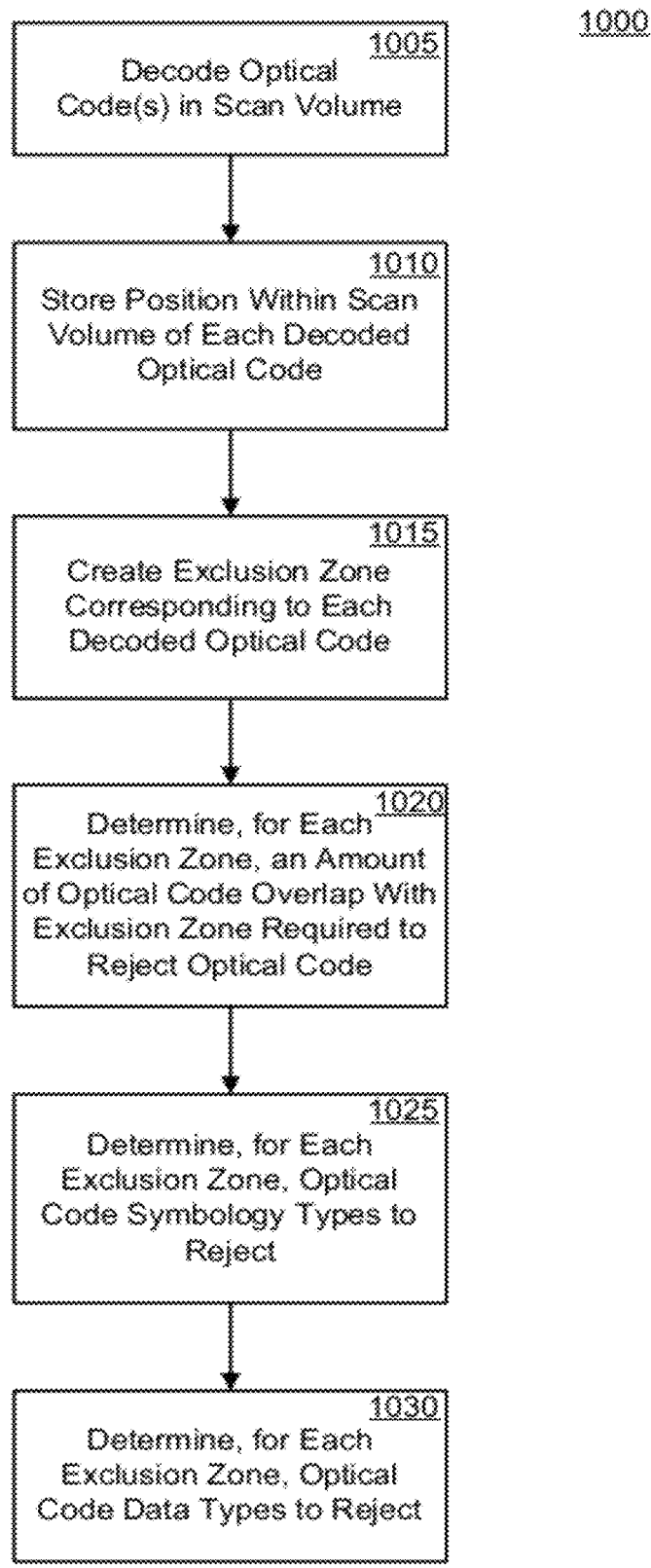
FIG. 10 is a flowchart illustrating a method of interactively training a data reader to selectively read and accept optical codes, according to one embodiment.

FIG. 9 is a flowchart illustrating a method 900 of configuring a data reader to selectively read and accept optical codes, according to one embodiment. As will be described with reference to steps 905 through 920, various commands may be read defining a position of each exclusion zone within the scan volume and one or more parameters associated with each exclusion zone. According to one embodiment, the commands are transmitted by the host to the data reader via an interface (e.g., network interface 1195 of FIG. 11, interface 1172, input controller 1190, or a dedicated test port interface for system testing and configuration). Additionally, the commands may be stored in memory 1160, memory 1170, a portable storage device via interface 1172 (e.g., a flash drive), or any combination thereof, or accessed by the data reader over a wired or wireless network (e.g., via the network interface 1195). Further, the commands may be read by the data reader from one or more configuration optical codes (e.g., optical codes having instructions or commands encoded therein). Thus, existing systems may readily be upgraded in the field by providing the user with a data qualifying module (e.g., data qualifying module 1350 of FIG. 13 or 1590 of FIG. 15) comprising a set of instructions for selectively accepting optical codes within a scan volume and various commands defining a position of each exclusion zone within the scan volume and one or more parameters associated with each exclusion zone (e.g., stored on a machine-readable medium or encoded in a configuration optical code). U.S. Pat. Nos. 4,866,257, 4,861,972, and 6,612,495, which are hereby incorporated by reference in their entireties, disclose examples on how a data reader may be configured by scanning a configuration optical code or by downloading information from a host computer.

At step 905, one or more commands are read specifying a position of each exclusion zone within the scan volume. The position of each exclusion zone within the scan volume may be defined as previously described with reference to FIGS. 1 through 4. Additionally, certain exclusion zones may be applicable only to certain laser based scanners or imaging based scanners or image fields associated therewith. Thus, one or more of the commands may specify to which scanner (s) or image fields of each scanner each exclusion zone is applicable (e.g., one exclusion zone may only be applicable to an imaging based scanner associated with the lower window of a multiwindow scanner and another exclusion zone may only be applicable to an imaging based scanner associated with the upper window).

At step 910, one or more commands are read specifying, for each exclusion zone, an amount of optical code overlap that is required with an exclusion zone to reject the optical code (e.g., not transmit the decoded optical code data). For example, each exclusion zone may be of a certain type (e.g., type 1, type 2, or type 3) as previously described with reference to FIGS. 1 through 5.

One or more commands may optionally be read at step 915 specifying, for each exclusion zone, which optical code symbology types to reject. For example, each exclusion zone may have associated therewith certain symbology types of the optical codes (e.g., UPC, Code 39, Code 128, or PDF417) to accept or reject as previously described with reference to FIGS. 1 through 5. Step 915 may be omitted in certain embodiments. Additionally, one or more commands may optionally be read at step 920 specifying, for each exclusion zone, which optical code data types to reject. For example, each exclusion zone may have associated therewith certain data types to accept or reject as previously described with reference to FIGS. 1 through 5, such as optical codes having a random-weight-item number-system-character encoded therein. The data types to accept or reject may be specified with wild cards. Step 920 may be omitted in certain embodiments.

Instead of, or in addition to, reading various commands to configure a data reader to selectively read and accept optical codes, the operator may train the data reader to selectively read and accept optical codes, which may be useful if at least some of optical codes that should not be read and accepted remain in a fixed location (e.g., shelf items). FIG. 10 is a flowchart illustrating a method 1000 of interactively training a data reader to selectively accept optical codes, according to one embodiment. Initially, the user positions the data reader and the objects having optical codes thereon that should be ignored in a desired layout configuration and enables a scanner training mode. For example, after installing the data reader at a point-of-sale, a merchant may begin a training routine to program the data reader to ignore optical codes at certain locations within the scan volume.

After entering the training mode, the optical codes within the scan volume are decoded at step 1005 using any of the methods previously described (e.g., steps 505 and 510 of FIG. 5, steps 605 through 620 of FIG. 6, steps 705 and 710 of FIG. 7, and steps 805 through 820 of FIG. 8). At step 1010, a position within the scan volume of each optical code is stored using any of the methods previously described (e.g., step 625 of FIG. 6, step 715 of FIG. 7, and step 825 of FIG. 8). Optionally a position of one or more of the decoded optical codes within the scan volume may be determined before storing the position using any of the methods previously described (e.g., step 515 of FIG. 5).

At step 1015, an exclusion zone is created corresponding to each optical code that was decoded at step 1005. For example, with reference to FIG. 2, if an optical code has a start character beginning at pixel location (100,100), a stop character ending at pixel location (300,100), and a height of one hundred pixels, an exclusion zone may be defined by a set of all pixels bound by a rectangle having vertices with the coordinates (100,100), (100,200), (300,200) and (300,100) (assuming the image 200 comprises a 1280×1024 image and the origin of the coordinate system is located in the upper-left portion of the image 200). The exclusion zone may be defined so that it is the same size as the optical code, or it may be defined so that it is larger or smaller than the optical code. Defining the exclusion zone so that it is larger than the optical code may facilitate slight positional changes of the optical code (e.g., it may be desirable to reject an optical code on a shelf item even if the shelf item is shifted to the left or right, for example, in comparison to a position of the shelf item during the training mode). For example, the exclusion zone may be defined so that it is three percent larger than the decoded optical code. Additionally, one or more adjacent exclusion zones may be combined to form a larger exclusion zone.

At step 1020, an amount of optical code overlap with an exclusion zone that is required to reject the optical code (e.g., not transmit the decoded optical code data) is determined for each exclusion zone. For example, each exclusion zone may be of a certain type (e.g., type 1, type 2, or type 3) as previously described with reference to FIGS. 1 through 5 and the operator may be prompted to specify an exclusion zone type via a user interface. Step 1020 may be omitted in certain embodiments.

At step 1025, a determination of which optical code symbology types to reject is made for each exclusion zone. For example, the operator may be prompted to specify whether only optical codes matching the symbology type decoded at step 1005 should be rejected in future scans if at least partially within the exclusion zone or whether all symbology types should be rejected. Additionally, the operator may be presented with a list of symbology types from which the operator may select the optical code symbology types to reject. Step 1025 may be omitted in certain embodiments.

At step 1030, a determination of which optical code data types to reject is made for each exclusion zone. For example, the operator may be prompted to specify whether only optical codes having the same decoded data determined at step 1005 should be rejected in future scans or whether any optical code should be rejected. After step 1030, the method 1000 may end. Step 1030 may be omitted in certain embodiments.

The systems and methods for selectively reading and accepting optical codes within a scan volume of a data reader described herein may be implemented in or by one or more of the example data readers described with reference to FIGS. 11 through 18 or a general-purpose or special-purpose computing environment.

Figure 11:
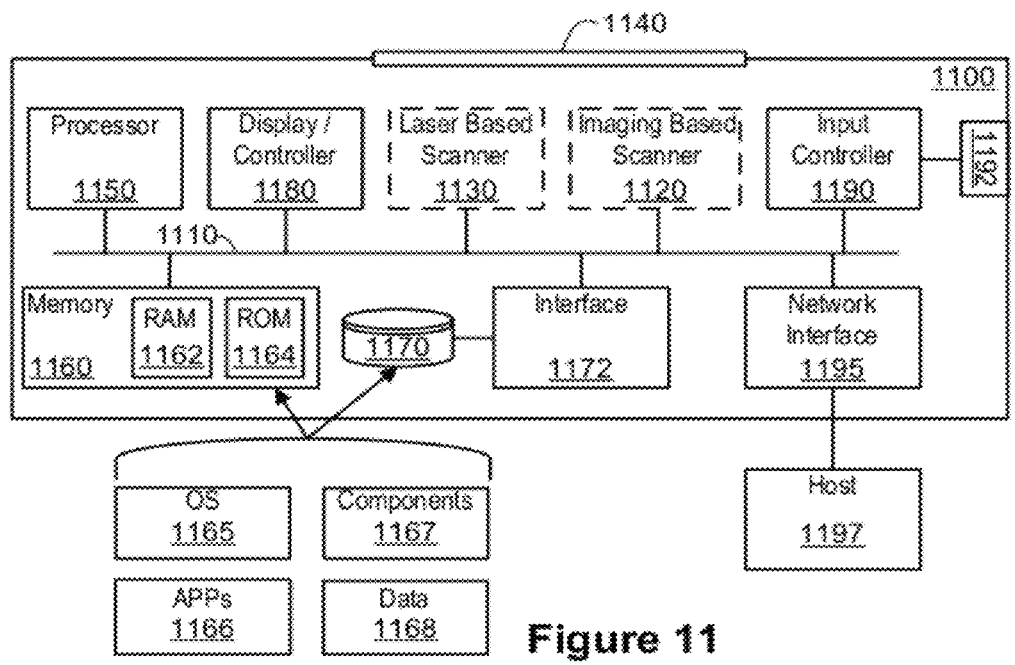
FIG. 11 is a block diagram of a data reader including an imaging based scanner and laser based scanner, according to one embodiment.

FIG. 11 is a block diagram showing operational components of a data reader or scanner or scanning system 1100, according to one embodiment. While a bus-based architecture, based on a bus 1110, is illustrated in FIG. 11, other types of architectures are also suitable (e.g., one or more of the components directly coupled to one another). The data reader 1100 may incorporate any number of data readers, such as an imaging based scanner 1120, a laser based scanner 1130, or both. The imaging based scanner 1120 and laser based scanner 1130 attempt to read encoded symbols through a window 1140. Other positions or configurations of the scanners may be employed. For example, the data reader 1100 may include only an imaging based scanner 1120, only a laser based scanner 1130, or both. Additionally, the data reader 1100 may comprise a multiwindow scanner, such as a two window scanner sometimes referred to as a bioptic scanner, including a lower window arranged in a generally horizontal plane and an upper window arranged in a generally vertical plane with imaging based scanners, laser based scanners, or both, attempting to read encoded symbols through the windows.

The data reader 1100 may include a number of other components that interface with one another via the bus 1110, including a processor 1150, memories 1160 and 1170, a display controller and display device 1180, an input controller 1190, and a network interface 1195. The processor 1150 may be any commercially available processor or other logic machine capable of executing instructions. Additionally, more than one processor may be provided. The display controller and display device 1180 may be provided to present data, menus, and prompts, and otherwise communicate with the user via one or more display devices, such as a transmissive or reflective liquid crystal display (LCD), cathode ray tube (CRT) display, or other suitable display.

The standard input controller 1190 may be configured to receive user input from a keyboard, a pointing device, or other wired/wireless input devices. Other input devices may be included, such as a microphone, touchscreen, touchpad, and trackball. While the input devices may be integrated into the data reader 1100 and coupled to the processor 1150 via the input controller 1190, input devices may also connect via other interfaces, such as a connector 1192. The connector 1192 may include one or more data interfaces, bus interfaces, wired or wireless network adapters, or modems for transmitting and receiving data. Accordingly, the input controller 1190 may include one or more of hardware, software, and firmware to implement one or more protocols, such as stacked protocols along with corresponding layers. Thus, the connector 1192 may function as one or more of a serial port (e.g., RS232), a Universal Serial Bus (USB) port, and an IR interface. The input controller 1190 may also support various wired, wireless, optical, and other communication standards.

The network interface 1195 may be provided to communicate with one or more hosts 1197 or other devices (e.g., a computer, a point-of-sale terminal, a point-of-sale computer system, or a cash register). For example, data gathered by, or decoded by, the image based scanner 1120 or laser based scanner 1130 may be passed along to the host computer 1197. According to one embodiment, the network interface 1195 comprises a universal interface driver application specific integrated circuit (UIDA). Further details of the UIDA can be found in U.S. Pat. No. 6,877,663, which is hereby incorporated by reference in its entirety. The network interface 1195 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), and USB. A wireless connection may use low or high powered electromagnetic waves to transmit data using any wireless protocol, such as Bluetooth™, IEEE 802.11b (or other WiFi standards), infrared data association (IrDa), and radiofrequency identification (RFID).

The data reader 1100 may include memory 1160, which may be implemented using one or more standard memory devices. The memory devices may include, for instance, RAM 1162, ROM 1164, and EEPROM devices, and may also include magnetic or optical storage devices, such as hard disk drives, flash memory, CD-ROM drives, and DVD-ROM drives. The data reader 1100 may also include an interface 1172 coupled to an internal hard disk drive 1170. In addition, the interface 1172 may also be coupled to a magnetic floppy disk drive, an optical disk drive, or another drive and may be configured for external drive implementations, such as over a USB, IEEE 1194, or PCMCIA connection.

According to one embodiment, any number of program modules are stored in the drives (e.g., drive 1170) and ROM 1164, including an operating system (OS) 1165, one or more application programs 1166, other program modules 1167 (e.g., instructions to implement the methods described herein), and data 1168. All or portions of the program modules may also be cached in RAM 1162. Any suitable operating system 1165 may be employed. One of the program modules 1167 may comprise a set of instructions to implement the systems and methods for selectively reading and accepting optical codes described herein. Additionally, the data 1168 may include one or more configurations settings (e.g., exclusion parameters) for configuring how the data reader 1100 selectively reads and accepts optical codes.

Other versions of the data reader 1100 may have less than all of these components, may contain other components, or both. The data reader 1100 may comprise a fixed scanner, such as a Magellan® scanner manufactured by Datalogic Scanning, Inc. of Eugene, Oreg. However, the data reader 1100 may also comprise other types of scanners, such as a portable scanner.

Figure 12:
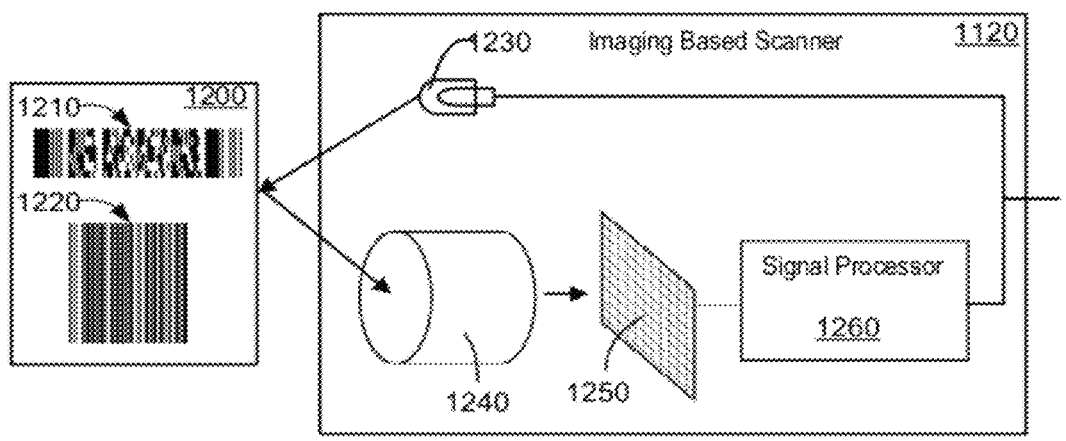
FIG. 12 is a block diagram of the imaging based scanner of FIG. 11, according to one embodiment.

FIG. 12 is diagram of an imaging based scanner 1120 for forming an image of an item or object 1200, according to one embodiment. The object 1200 may be any object, but in one preferred use, the object 1200 is an item upon which is printed an optical code, such as barcode 1210 (PDF417) and barcode 1220 (Code 128). The imaging based scanner 1120 comprises an illumination source 1230, a lens assembly 1240, an imager 1250, and a signal processor 1260. The imaging based scanner 1120 may comprise other components not illustrated or may omit certain components illustrated, such as the illumination source 1230 and thus rely on ambient light. The illumination source 1230 may comprise any suitable source of light, such as a row of light emitting diodes (LEDs), flash strobes, or incandescent or fluorescent lamps.

The lens assembly 1240 may comprise one or more lenses for focusing light on imager 1250. For example, the lens assembly 1240 may comprise a single optical element or may comprise an array of optical elements with a common axis. The lens assembly 1240 may also comprise a zoom lens coupled to the processor 1150 to control an amount of optical zoom. The imager 1250 forms an electronic image of the object 1200. The imager 1250 may comprise a wide range of image sensing devices for converting an optical image (or another wave in the electromagnetic spectrum) into an electrical signal. For example, the imager 1250 may be a digital camera, such as a charge-coupled device (CCD) camera or complimentary metal-oxide semiconductor (CMOS) camera, both of which form a one-dimensional or two-dimensional array of pixels, which together constitute an electronic representation of the image. Each pixel location stores data indicative of the light intensity at that location of the image. The light intensity data for each pixel may represent a color (e.g., red-green-blue) or monochrome intensity (e.g., grayscale).

After the imager 1250 has been exposed to light reflected by the object 1200, data from all the pixels can be sequentially read out in a selectable pattern (which may be row-by-row, column-by-column, or some other pattern). The pixel intensity data may optionally be converted to digital form using an analog-to-digital converter circuit before being sent to the signal processor 1260. The signal processor 1260 conditions the data received from the imager 1250 and may generate an output that generally identifies which regions of the image correspond to light areas, and which correspond to dark areas. For example, the signal processor 1260 may set the exposure time and thresholding so that the bars or relatively darker regions of the barcode or other target are reported as being dark, and the spaces or relatively lighter regions between the bars or darker regions are reported as being light, according to any of a number of techniques. Either analog or digital signal processing may be utilized in the signal processor 1260. While the imager 1250 and the signal processor 1260 may be contained in the same integrated circuit, other configurations are possible. For example, the signal processor 1260 may be implemented by the processor 1150 (FIG. 11) or one or more other logic machines capable of executing instructions or which implement predetermined algorithms using combinatorial logic, state machines, or both.

Figure 13:
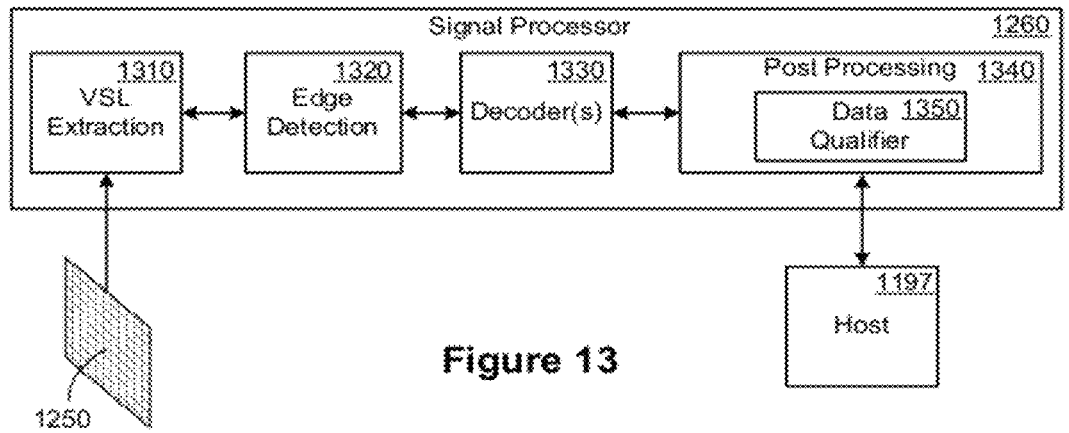
FIG. 13 is a block diagram illustrating an example signal processor of the imaging based scanner of FIG. 12.

FIG. 13 is a block diagram illustrating a signal processor 1260 implementing or executing various components or modules, according to one embodiment. Preferably, only a select portion or sub-region of the image data captured by the imager 1250 corresponding to one or more sub-regions is stored and processed. Optionally, the select portion or sub-region may be stored in a memory, such as memories 1160 or 1170. According to one embodiment, all of the image data captured by the imager 1250 may be used to search for and decode a barcode (e.g., using any suitable two-dimensional decoding algorithm). The signal processor 1260 may optionally include or execute a sub-region or virtual scan line extraction module 1310 to read or assemble samples or pixels from the imager 1250 lying along one or more lines or other defined paths across the image at arbitrary angles with respect to one another or in another desired scan pattern. For example, the extraction module 1310 may compute coordinates for one or more straight lines using raster-based line drawing algorithms, such as the Bresenham line drawing algorithm, and select pixels from the imager 1250 along such lines. Similarly, coordinates for curved lines, such as quadratic lines, can be computed with second order difference techniques, as also described by Bresenham. The sub-region extraction module 1310 may define and map sub-regions onto a raster pattern, thereby allowing the pixels of the raster which fall on the sub-regions to be identified and processed for decodable data, and possible stored for later processing. Storing only a select portion of the image data corresponding to sub-regions reduces the total amount of data that needs to be stored and processed. Additional virtual scan line processing techniques are described in U.S. Pat. No. 6,142,376, which is hereby incorporated by reference in its entirety. While the extraction module 1310 may extract data corresponding to virtual scan lines, the extraction module 1310 may extract data corresponding to other regions or sub-regions of the image for use in edge detection. The extraction module 1310 may be omitted in certain embodiments (e.g., if a two-dimensional decoding algorithm is used).

An edge detection module 1320 identifies edge transition locations in the extracted data using any suitable edge detection technique. For example, after an image of the object 1200 has been captured by the imager 1250, the image may be represented by a certain number of pixels, each of which is represented by a certain value. For a grayscale image where each pixel is represented by 8 bits, a pixel may have a value ranging from 0 (black) to 255 (white) with various shades of gray between 0 and 255. While the image may be a grayscale image, it may also be a color image or a black-and-white image. Additionally, while each pixel may be represented by 8 bits, each pixel may be represented by any number of bits (e.g., 10 bits or 12 bits). Further, while the following discussion refers to the entity under analysis as pixels, the entity under analysis may also be a subpixel, sub-block of the image, sub-region of the image, or any other region of the image being used in edge detection.

Because edges in images generally have strong intensity contrasts, an increase (or decrease) in intensity from one pixel to the next is indicative of an edge. Accordingly, many edge detection techniques involve calculating a derivative of the intensity changes in pixel values (e.g., intensity changes between a first pixel and an adjacent pixel or more than one adjacent pixels). With regard to a first derivative, an edge transition can occur at a local maxima. With regard to second derivatives, edges occur at zero crossings. Thus, edges may be located by convolving image data with a kernel that approximates a first or second derivative.

According to one edge detection technique, pixel values of adjacent pixels are compared to identify edge transitions. For example, a pixel value of a current pixel can be compared to a pixel value of a previous pixel. If the magnitude of the change in pixel values is greater than or equal to a threshold value, an edge has been found. Thus, the threshold value helps define the minimum modulation in the pixel values between adjacent pixels needed to signify an edge transition. According to another edge detection technique, the current pixel value may be compared to more than one adjacent pixel (e.g., a window of pixels). By comparing the current pixel value to an average of a window of pixels, the effect of noise (e.g., an erroneously high or low pixel value) can be minimized. For example, pixel summing or averaging may be performed in a direction orthogonal to a virtual scan line as described in U.S. Patent Publication No. 2008/0169347, which is hereby incorporated by reference in its entirety. The edge detection module 1320 may use any number of other edge detection techniques, such as one or more of the edge detection techniques described in U.S. Patent Publication No. 2006/0071078 or one or more of the subpixel edge detection techniques disclosed in U.S. Pat. No. 5,446,271, both of which are hereby incorporated by reference in their entireties. In general, subpixel edge detection involves interpolating image intensities at intermediate positions between pixels. Further, any number of edge detection operators (or variations of operators) may be used. For example, first order operators, such as Canny, Prewitt, Sobel, and Roberts Cross, may be used. In addition, second order operators, such as Marr-Hildreth, may be used.

Based on the edge locations, one or more decoders 1330 (e.g., low level decoders, high level decoders, or any combination thereof) may convert the sequence of edges and spacing between the edges into data usable by the host 1197. For example, a low level decoder may convert the sequence of edges and spacing between the edges into a set of barcode elements, such as start patterns, stop patterns, and codewords, and a high level decoder may convert the barcode elements into decoded characters, which may be alphanumeric. The specific nature of the decoder(s) varies depending on the particular symbology used to encode the data. For example, in the PDF417 symbology data is encoded by (1) converting data into codewords (i.e., high level encoding) and (2) representing the codewords with a certain sequence of bars and spaces (i.e., low level encoding). Thus in the PDF417 symbology, data may be decoded by (1) converting the sequence of bars and spaces into codewords (i.e., low level decoding) and (2) converting the codewords into data (i.e., high level decoding). Thus, after the edge detection module 1320 identifies edges in the data captured by the imager 1250, the relative locations of the edge transitions can be converted back into codewords via a low level decoder and the codewords can be converted into data usable by the host 1197 by a high level decoder. The signal processor 1260 may include a set of decoders 1330 for each symbology the data reader 1100 is configured to read.

The decoder 1330 may also combine partial sections of an optical code to form data representing the complete optical code using a process known as stitching, further details of which can be found in U.S. Pat. No. 5,493,108, which is hereby incorporated by reference in its entirety.

The signal processor 1260 may include a post processing module 1340 to further process the output from the decoder(s) 1330 before sending the data to the host 1197 (e.g., via interface 1195). For example, the post processing module 1340 may include a data qualifying module 1350. The data qualifying module 1350 determines whether to accept one or more decoded optical codes based on a position of each optical code relative to one or more exclusion zones using any of the methods previously described. Additionally, if an optical code is at least partially within an exclusion zone, the data qualifying module 1350 may determine whether to accept the decoded optical code based the symbology type that decoded the optical code, the decoded optical code data, or both. The data qualifying module 1350 may comprise hardware, software, firmware, or any combination thereof, and may comprise a set of instructions stored in a memory, such as memories 1160 and 1170.

The signal processor 1260 may further comprise other modules, such as an amplification module to amplify one or more spatial frequencies, a filtering module, and a timer module. The timer module may be used to indicate when to stop attempting to find characters. For example, to maximize throughput, the timer module may begin measuring a time interval at some event such as the start of decoding data from an image frame, or the detection of a potential optical code within an image frame, and the edge detection module 1320, the decoder(s) 1330, or both, may stop looking for characters after a certain period of time or after a certain number of data frames have been captured. In other words, the timer module prevents the edge detection and decoder modules from spending too much time trying to decode data that is not readable or decodable (or at least not easily readable or decodable) or that has already been decoded.

Figure 14:
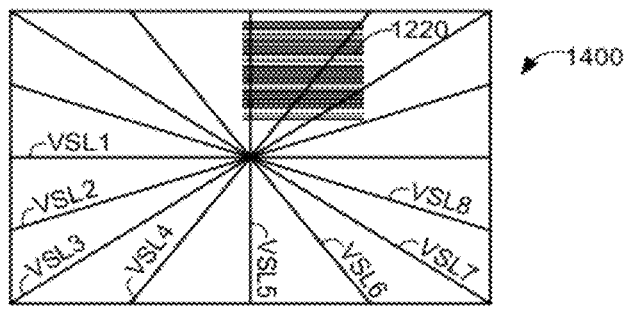
FIG. 14 illustrates the data reader of FIG. 12 extracting data from a captured image of an optical code corresponding to various sub-regions.

FIG. 14 diagrammatically illustrates reading or assembling samples or pixels from the imager 1250 or a raster image 1400 (or from an incoming video stream) lying along one or more sub-regions VSL1 through VSL8, which may then be stored in a buffer or other memory. By way of example, the raster 1400 represents a generally rectangular grid of image data captured by the image sensor and may comprise a data file wherein each pixel is represented by a certain number of bits. As shown in FIG. 14, sub-regions VSL4 and VSL5 are both coincident with the optical code 1220. As shown, sub-region VSL3 only captures partial information about the optical code 1220. However, this partial portion of the optical code 1220 may be stitched together with other partial portions (not shown) to form a complete optical code. The sub-regions can be arranged in any pattern, which is generally selected so that there is a reasonable likelihood that at least one of the sub-regions will be coincident with an optical code, such as the optical code 1220. Accordingly, the sub-region pattern may be defined based on the dimensions of the optical code to be scanned, the scanning area size, the scanning sensor and optics characteristics, the processing bandwidth, or any combination thereof. For example, a sub-region pattern including more tightly spaced horizontal sub-regions may be used to decode stacked codes, such as PDF417. Additionally, while data may be extracted from a captured image of an optical code along various sub-regions, data corresponding to other portions of the acquired image (e.g., one or two dimensional virtual scan lines, sub-regions, or sub-pixels) may be extracted or the entire acquired image may be processed using a two-dimensional decoding algorithm. For example, the two-dimensional decoding algorithm may process the image data pixel-by-pixel (e.g., starting in the upper-left corner of the acquired image and snaking through the image one pixel at a time until reaching the lower-right corner of the acquired image) to locate edge transitions and decode the image data based on the edge transition locations.

FIG. 15 is a diagram of a laser based scanner 1190, according to one embodiment. The laser based scanner 1190 includes a front end 1500, a photodetector 1510, and a signal processor 1520. The front end 1500 includes a controller 1530, a light source 1540, a deflector or spinner 1550, and one or more pattern mirrors 1560. The controller 1530 is the primary interface between the data reader 1100 and the components of the front end 1500. Thus, the controller 1530, among other things, determines whether the light beam generated by the light source 1540 is on or off and may also control the brightness of the light beam. The functions of the controller 1530 may be implemented in dedicated circuitry, or some or all of the functions may be performed by processor 1150.

The light source 1540 projects a scanning beam out to the object 1200 (e.g., that may contain a barcode or other symbol). Preferably, the light source 1540 comprises a laser diode. Alternatively, other types of light sources, such as a He—Ne laser, other types of lasers, and/or focused beams of non-laser light may be used instead of a laser diode.

Scanning with the light beam is accomplished using a beam deflector 1550. The beam deflector 1550 may comprise an oscillating mirror driven by an oscillating beam dither driver. Movement of the oscillating mirror causes the scanning light beam to move back and forth, and to thereby trace a line-shaped path over the target barcodes or other target symbols or indicia. However, the beam deflector 1550 may take other forms. For example, the beam deflector 1550 may comprise a rotating polygon with a plurality of mirrored facets or the laser diode itself may be rotated or oscillated.

One or more pattern mirrors 1560 may be aligned around the circumference of the beam deflector 1550 for deflecting a set of scan beams outwardly through the window 1140. Thus, the pattern mirrors 1560 generate respective scan lines 1562 across the object 1200 in a collective scan pattern, such as scan pattern 1564. As the beam deflector 1550 oscillates (or rotates) through its scan arc, the resultant light beam traverses corresponding ones of the pattern mirrors 1560, which in turn create corresponding scan lines 1562. For example, if the beam deflector 1550 comprises a rotating polygon having four mirrored facets, each facet reflects an incident light beam (e.g., from the laser 1540) outwardly along a respective 180° scanned arc as the polygon rotates.

As the scanning beam from the light source 1540 sweeps across the object 1200 (e.g., with an optical code or other symbol thereon), the scanning beam is reflected by the object 1200. Because the bars of the barcode have lower reflectivity than the spaces between the bars, the amount (or intensity) of reflected light will vary depending on whether the projected spot of the scanning beam is incident upon a bar or a space.

The light reflected from the object 1200 is collected by appropriate collection optics (which may include lenses and/or collecting mirrors), and directed towards a photodetector 1510, such as a photodiode. The reflected beam follows a return path that is generally similar to the forward path (e.g., the reflected beam reflects off of a respective pattern mirror 1560 toward the beam deflector 1550), but diverges away from the forward scan path to avoid obstruction of the forward path. The photodetector 1510 converts variations in incident light level into a signal that has features (i.e., peaks and valleys) which correspond (in width) to the physical width of relatively darker and relatively lighter portions of the surface of the object 1200, which may include a symbol, indicia, or bar code to be read.

The signal output from the photodetector 1510 is then processed by the signal processor 1520, which may include an amplifier 1570, an edge detector 1575, one or more decoders 1580, and a post processing module 1585. The amplifier 1570 amplifies the signal output from the photodetector 1510. Preferably, the gain of the amplifier 1570 is adjusted using an automatic gain control (AGC) system, in which an output of either the amplifier itself or another component (e.g., a noise reduction circuit) is fed back to control the gain of the amplifier 1570.

The edge detector 1575 locates the edges of the amplified signal output from the amplifier 1570 using any of a variety of techniques. Because edges in images generally have identifiable intensity contrasts, a jump in intensity from one point on the signal to another point on the signal can indicate an edge. Accordingly, the edge detector 1575 may calculate a derivative of the signal to identify edges. With regard to a first derivative, an edge transition can occur at a local maxima. With regard to second derivatives, edges occur at zero crossings. Suitable techniques of edge detection are described, for example, in U.S. Pat. No. 5,463,211 (Arends et al.) or U.S. Pat. No. 4,000,397 (Hebert et al.), both of which are hereby incorporated by reference as if set forth fully herein.

Based on the edge locations, one or more decoders 1580 (e.g., low level decoders, high level decoders, or any combination thereof) may convert the sequence of edges and spacing between the edges into data usable by the host 1197. For example, a low level decoder may convert the sequence of edges and spacing between the edges into a set of barcode elements, such as start patterns, stop patterns, and codewords, and a high level decoder may convert the barcode elements into decoded characters, which may be alphanumeric. The specific nature of the decoder(s) varies depending on the particular symbology used to encode the data. The signal processor 1520 may include a set of decoders 1580 for each symbology the data reader 1100 is configured to read.

The decoder 1580 may also combine partial sections of an optical code to form data representing the complete optical code using a process known as stitching, further details of which can be found in U.S. Pat. No. 5,493,108.

The signal processor 1520 may include a post processing module 1585 to further process the output from the decoder(s) 1580 before sending the data to the host 1197 (e.g., via interface 1195). For example, the post processing module 1585 may include a data qualifying module 1590 (which may be similar or identical to the data qualifying module 1350) that determines whether to accept one or more decoded optical codes based on a position of each optical code relative to one or more exclusion zones using any of the methods previously described. The data qualifying module 1590 may comprise hardware, software, firmware, or any combination thereof, and may comprise a set of instructions stored in a memory, such as memories 1160 and 1170.

The signal processor 1520 may further comprise other modules, such as a noise reduction module, a filtering module, and a timer module. The noise reduction module may eliminate or reduce edges in the amplified signal attributed to noise, and operates for example, by discarding or ignoring edges detected whenever the first derivative of the amplified signal is below a threshold value. As previously described, the timer module may be used to indicate when to stop attempting to find characters so that the edge detection and decoder modules do not spend too much time trying to decode data that is not readable or decodable (or at least not easily readable or decodable) or that has already been decoded.

Figure 16:
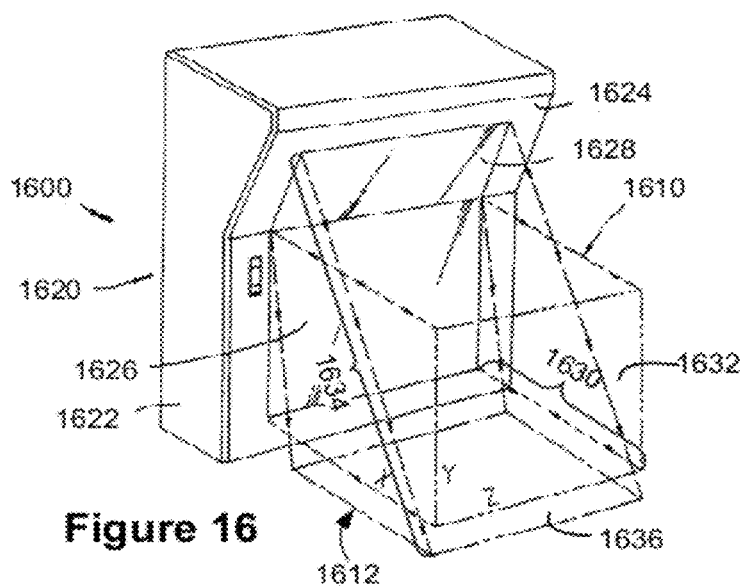
FIG. 16 is a perspective view of a scan volume associated with a multiplane data reader, according to one embodiment.

FIG. 16 is a schematic diagram of a multiplane data reader 1600 having a scan volumes 1610 and 1612 associated therewith, according to one embodiment. While FIG. 16 illustrates one example of a multiplane data reader 1600, other configurations are possible, such as the generally "L" shaped bioptic Magellan® scanner manufactured by Datalogic Scanning, Inc. of Eugene, Oreg. The data reader 1600 includes a housing 1620 comprising a lower housing portion 1622 and an upper housing portion 1624. For a laser based scanner, the data reader 1600 generates the scan volumes generally designated 1610 and 1612 by scanning beams projected outwardly through lower and upper windows 1626 and 1628. The far limit of the laser based scanner scan volume is limited by various factors, such as a far focus limit of the laser spot and the amplitude of the collected reflected light. For an imaging based scanner, the scan volumes 1610 and 1612 are generally defined by a depth of field (e.g., depth of field 1630 and depth of field 1634) and a field of view at a far focus limit of the depth of field (e.g., field of view 1632 and field of view 1636) associated with the lens assembly (see, e.g., lens assembly 1240 of FIG. 12) and the imager behind respective windows 1626 and 1628. In order to facilitate referral to relative directions, orthogonal coordinates (X, Y, Z) are designated in FIG. 16. The X coordinate is defined as a sideways direction, perpendicular to or horizontally outward from the lower window 1626 of the scanner housing 1620; the Y coordinate is defined as a vertically upward direction; and the Z coordinate is defined as another horizontal direction parallel to the lower window 1626.

Regardless of whether the data reader 1600 includes one or more laser based scanners, one or more imaging based scanners, or any combination thereof, behind the windows 1626 and 1628, the data reader 1600 will have a depth of field and a field of view (at the far focus limit distance of the depth of field) associated with each scanner behind the windows 1626 and 1628. Generally laser based scanners have a larger depth of view than imaging based scanners due to the coherent nature of the laser beam. According to one embodiment, the data reader 1600 includes an imaging based scanner behind each of windows 1626 and 1628. The imaging based scanner behind window 1626 has a depth of field 1630 in which optical codes would generally be in sufficient focus to be decoded and a field of view 1632 (a certain distance from the lens assembly, such as the far focus limit of the depth of field 1630) lying in a plane that is generally parallel to window 1626. The field of view may also be expressed as an angular field of view. The imaging based scanner behind window 1628 has a depth of field 1634 in which optical codes would generally be in sufficient focus to be decoded and a field of view 1636 (a certain distance from the lens assembly, such as the far focus limit of the depth of field 1634) coincident with a surface, such as a checkout counter, running along the window side of the lower housing portion 1622.

If more than one imaging based scanner or laser based scanner is located behind each window, each window may have multiple depths of field and fields of view associated therewith. Additionally, each scanner may have multiple view points with corresponding fields of view if a set of N redirecting mirrors (where N 1) are provided and configured to focus more than one area of interest onto an imager. In other words, instead of looking through the window in a certain direction (e.g., generally parallel to the X-axis), the scanner may effectively look through the window in multiple directions using the redirecting mirrors. For example, to increase the scan volume 1610, the scanner associated with the window 1626 may include a set of redirecting mirrors that effectively allow the scanner to look in three directions at once (e.g., parallel to the X-axis, an angle above the X-axis to expand the scan volume 1610 in a vertically upward direction, and an angle below the X-axis to expand the scan volume 1610 in a vertically downward direction). In other words, an image formed on the scanner's imager may effectively be divided into three sections. One section may look through the window 1626 in a direction parallel to the X-axis, another section may look through the window 1626 in a direction above the X-axis, and the remaining section may look through the window 1626 in a direction below the X-axis. Further details of data readers having multiple image fields can be found in U.S. Application Publication No. 2007/0297021, which is hereby incorporated by reference in its entirety.

While the discussion of selectively reading and accepting optical codes within a scan volume of the data reader may have been described herein with reference to a single scanner that does not utilize redirecting mirrors, the systems and methods described herein for selectively reading and accepting optical codes within a scan volume of the data reader are equally applicable to data readers including multiple scanners, each of which may utilize one or more redirecting mirrors. Together, the multiple scanners and redirecting mirrors help define a larger scan volume than may otherwise be defined by a single scanner with no redirecting mirrors. For example, the scan volume may have larger dimensions and may be able to read optical codes on objects having various orientations within the scan volume because the scanner is effectively looking at the object from different points of view (e.g., the data reader may be able to read optical codes on various sides of an object without rotating the object within the scan volume because the data reader may be able to see the top, bottom, and one or more other sides of an object within the scan volume).

While the scan volume 1610 is depicted generally as a cube in FIG. 16, the scan volume 1610 may not be bounded so tightly by the cube shape. For example, the sharpness of an object (e.g., an optical code) within the depth of field gradually decreases as the object moves away from an ideal focus point. Further, the field of view generally increases with distance from the lens. Thus, conceptually, the scan volume includes a portion of space proximate the data reader in which optical codes may be read (e.g., detected and decoded) by the data reader. In other words, the scan volume may be referred to as a volume within which there is a relatively high probability of a successful scan/read. A high level overview of the depth of field and field of view concepts will be described with reference to FIGS. 17 and 18 along with a discussion of how depth of field and field of view interplay to form a scan volume.

Figure 17:
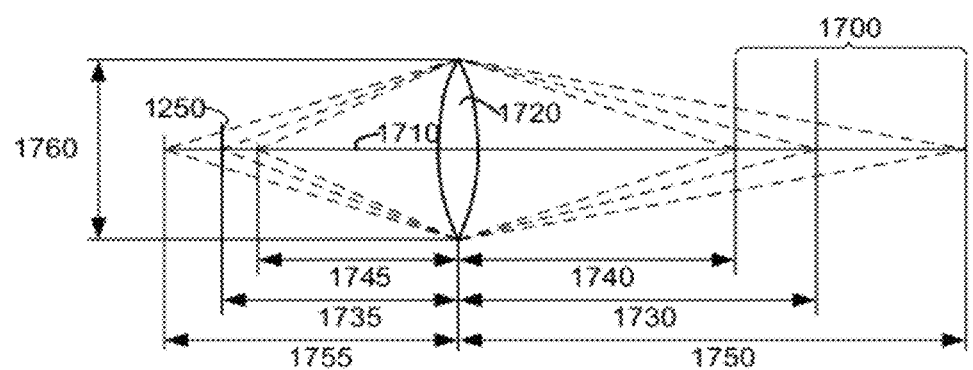
FIG. 17 is a schematic diagram illustrating a depth of field associated with a single lens data reader, according to one embodiment.

FIG. 17 is a schematic diagram illustrating a depth of field 1700 associated with a single lens data reader, according to one embodiment. The depth of field 1700 is the distance along an optical axis 1710 of lens 1720 in which an object, such as an optical code, appears to be in focus (or at least in sufficient focus to detect edge transitions of optical codes). An object, such as an optical code, positioned approximately a distance 1730 from the lens 1720 will be in best focus at approximately a distance 1735 from the lens 1720. Thus, the imager 1250 may lie in a plane generally parallel to the lens 1720 and be positioned approximately a distance 1735 from the lens 1720. An object located approximately a distance 1740 from the lens 1720 (i.e., the near limit of the depth of field 1700) will be in best focus at approximately a distance 1745 from the lens 1720. However, the object will be in sufficient focus at approximately a distance 1735 from the lens 1720 (i.e., the location of the imager 1250) for decoding purposes. Further, an object located approximately a distance 1750 from the lens 1720 (i.e., the far limit of the depth of field 1700) will be in perfect focus at approximately a distance 1755 from the lens 1720. However, the object will be in sufficient focus at approximately a distance 1735 from the lens 1720 (i.e., the location of the imager 1250) for decoding purposes. An aperture size or aperture diameter 1760 helps define the depth of field 1700 (i.e., the distance between the near limit and far limit of the depth of field 1700).

For example, decreasing the aperture diameter 1760 increases the depth of field 1700, but also reduces the amount of light transmitted through the lens 1720.

Referring again to FIG. 16, the scan volume 1610 is bound in one respect by the depth of field associated with each scanner (e.g., depths of field 1630 and 1634). The depth of field itself is a function of the distance between the lens and the object, a focal length of the lens, the optical code element size, and the aperture diameter of the lens. Thus, with respect to the scanner associated with the window 1626, an optical code on an object positioned between the near and far limits of the depth of field 1630 (and facing the window 1626) would be in sufficient focus to detect edge transitions of optical codes.

Figure 18:
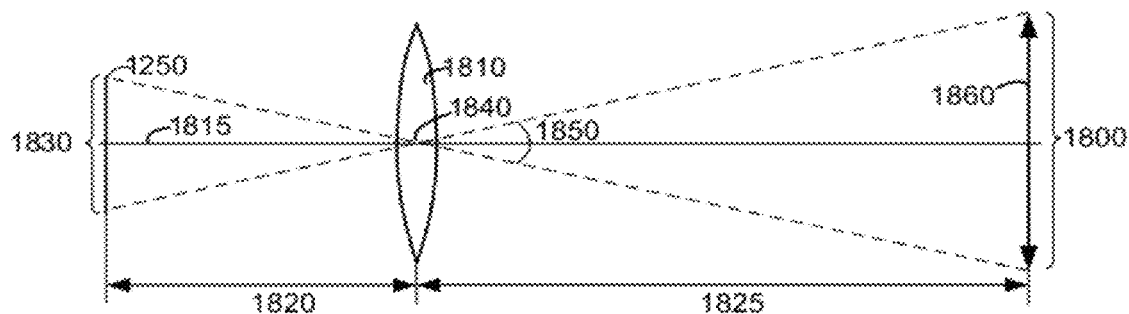
FIG. 18 is a schematic diagram illustrating a field of view associated with a single lens data reader, according to one embodiment.

FIG. 18 is a schematic diagram illustrating a field of view 1800 associated with a data reader, according to one embodiment. The field of view is the lateral extent orthogonal to an optical axis of a lens where an object positioned a certain distance from the lens is focused onto an imager of the data reader. The overall dimensions of the imager and the imager's position relative to the lens, the focal length of the lens, and the distance of an object from the lens define the field of view. For example, an imager 1250 positioned a distance 1820 away from a lens 1810 and extending a distance 1830 in an orthogonal direction from an optical axis 1815 of the lens 1810 would have a field of view 1800 through a pinhole 1840 of the lens 1810 at a distance 1825 from the lens 1810. Thus, an object 1860 at a distance 1825 from the lens 1810 would occupy the full extent of the imager 1250. Because the dimensions associated with the imager 1250 are generally fixed, the field of view of the imager 1250 through a pinhole 1840 of the lens 1810 will vary depending on the distance of the object from the lens 1810 (e.g., the field of view becomes smaller at a distance less than distance 1825). Thus, an angle of view 1850 may also be useful in describing an angular extent of an image that the imager 1250 can capture through the lens 1810.

Referring again to FIG. 16, the scan volume 1610 is bound in another respect by the field of view at the far limit of the depth of field associated with each scanner (e.g., fields of view 1632 and 1636). Thus, with respect to the scanner associated with the window 1626, an optical code on an object positioned anywhere within an area bound by the field of view 1632 at the far limit of the depth of field 1630 would be captured by the imager 1250 and be in sufficient focus to detect edge transitions thereof. While the depth of field and the field of view (at the far limit of the depth of field) are two factors that affect the overall size of the scan volume, other factors also affect the ability to detect edge transitions of optical codes (and thus the overall size of the scan volume), such as the intensity and type of light illuminating the optical code.

The description of FIGS. 11 through 18 have provided an overview of an example data reader and associated concepts. Other examples and additional details regarding data readers, scan volumes, and associated concepts may be found in the following commonly owned United States patents and patent applications, which are incorporated by reference herein in their entireties: U.S. Pat. No. 5,446,271; U.S. Pat. No. 5,635,699; U.S. Pat. No. 5,837,988; U.S. Pat. No. 6,932,273; U.S. Pat. No. 7,137,555; U.S. Pat. No. 7,299,975; U.S. Application Publication No. 2006/0278708; and U.S. Application Publication No. 2006/0081712. In light of the teachings herein, skilled persons will be aware of equivalent architectures, implementations, and variations for data readers.

The methods and systems disclosed herein may be implemented in or by any suitable hardware, software, firmware, or combination thereof. Accordingly, as used herein a component or module can comprise hardware, software, firmware, or any combination thereof (e.g., self-contained hardware or software components that interact with a larger system). For example, the methods and systems may exist as one or more software or firmware programs comprised of program instructions in source code, object code, executable code or other formats. A software module or component may include any type of computer instruction or computer executable code located within a memory device or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local or remote memory storage devices. In addition, data being tied or rendered together in a database record may be resident in the same memory device, or across several memory devices, and may be linked together in fields of a record in a database across a network.

Embodiments may include various steps, which may be embodied in machine-executable instructions to be executed by a general-purpose processor, special-purpose processor, or other electronic device. Alternatively, the steps may be performed by hardware components that include specific logic for performing the steps or by a combination of hardware, software, firmware, or any combination thereof. A result or output from any step, such as a confirmation that the step has or has not been completed or an output value from the step, may be stored, displayed, printed, or transmitted over a wired or wireless network.

Embodiments may also be provided as a computer program product embodied on a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product embodied on a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

While embodiments disclosed herein have been discussed in combination with barcodes, the embodiments disclosed herein may be utilized by other automated data collection/capture techniques, such as optical card readers. In addition, while the term character has been used herein to refer to a single group of bars and spaces that represent a specific number of letters, numbers, punctuations marks, or other symbols, it may also refer to a graphical shape representing a letter, numeral, or symbol or a letter, digit, or other symbol that is used as part of the organization, control, or representation of data. Further, while certain embodiments have been described with reference to sub-regions, other portions (e.g., one or two dimension virtual scan lines, sub-regions, sub-blocks, pixels, or sub-pixels) of the acquired image or the entire acquired image may be used. Additionally, the data qualifying module 1350 and data qualifying module 1590 may comprise or utilize any combination of the embodiments disclosed herein.

Thus, as should be appreciated in view of the teachings herein, certain embodiments may be capable of achieving certain advantages, including by way of example and not limitation one or more of the following: (1) providing a system and method for selectively reading and accepting an optical code within a scan volume of a data reader; (2) providing a system and method for selectively masking one or more portions of a scan volume of a data reader; (3) providing a system and method for selectively reading and accepting an optical code based on symbology type, data type, or both; (4) providing a system and method that helps avoid reading and accepting optical codes in space-constrained locations, such as a convenience store point-of-sale; (5) providing a data reader configuration having a scan volume that is more dependent on sensor resolution and optical code feature sizes than on the layout of objects surrounding the data reader, such as shelf items; (6) providing a data reader that does not require the reconfiguration of the area surrounding data reader, such as placing shelf items outside of the scan volume; (7) providing a data reader having a configurable setting that selectively masks one or more portions of the data reader's scan volume; (8) providing a data reader having a relatively large, easy to use scan volume that minimizes the risk of inadvertently reading and accepting optical codes positioned near the data reader; (9) providing a data reader having a scan volume that is configurable to provide an optimal scan volume for a particular application, such as a particular check stand design or store installation, without modifying the opto-mechanical design of the reader; (10) providing a data reader having a scan volume that is easily configurable on-site; and (11) providing a data reader having a variable scan volume that may adjusted at any time in response to changing circumstances.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A method of processing an optical code within a scan volume of a data reader, comprising the steps of:
    acquiring, via the data reader, scan data including an image or scan of an optical code located within the scan volume of the data reader, the scan volume having associated therewith a configurable exclusion zone that includes a first exclusion parameter defining a minimum amount of optical code overlap with the exclusion zone required to reject the optical code;
    processing the scan data for decodable data corresponding to the optical code;
    determining an extent to which the optical code overlaps with the exclusion zone;
    determining whether the extent to which the optical code overlaps with the exclusion zone meets or exceeds the minimum amount of optical code overlap defined by the first exclusion parameter; and
    if the extent to which the optical code overlaps with the exclusion zone does not meet or exceed the minimum amount of optical code overlap defined by the first exclusion parameter, reporting the acceptance of the optical code.

2. The method of claim 1 wherein the step of reporting the acceptance of the optical code is performed without regard to whether an aiming pattern projected into the scan volume intersects the optical code.

3. The method of claim 1 wherein the configurable exclusion zone includes a second exclusion parameter defining one or more optical code symbology types to reject and the step of reporting the acceptance of the optical code is not performed if a symbology type of the optical code corresponds to one of the optical code symbology types defined by the second exclusion parameter.

4. The method of claim 1 wherein the configurable exclusion zone includes a second exclusion parameter defining one or more optical codes to reject based on a data content of the optical code and the step of reporting the acceptance of the optical code is not performed if data encoded in the optical code corresponds to the data content of one or more of the optical codes defined by the second exclusion parameter.

5. The method of claim 1 wherein the configurable exclusion zone includes a second exclusion parameter indicating that an optical code having encoded therein a random-weight-item number-system-character is to be rejected and the step of reporting the acceptance of the optical code is not performed if the optical code includes a random-weight-item number-system-character.

6. The method of claim 1 wherein the configurable exclusion zone includes a second exclusion parameter indicating that an optical code having encoded therein a periodical number-system-character is to be rejected and the step of reporting the acceptance of the optical code is not performed if the optical code includes a periodical number-system-character.

7. The method of claim 1, further comprising:
    determining a position within a depth of field of the data reader of the optical code and wherein the step of reporting the acceptance of the optical code is performed based on the position within the depth of field of the optical code.

8. The method of claim 1 wherein the minimum amount of optical code overlap defined by the first exclusion parameter comprises the entire optical code.

9. The method of claim 1 wherein the minimum amount of optical code overlap defined by the first exclusion parameter comprises at least half of the optical code.

10. The method of claim 1 wherein the minimum amount of optical code overlap defined by the first exclusion parameter comprises any portion of the optical code.

11. The method of claim 1 wherein the scan volume has associated therewith multiple configurable exclusion zones, a first one of the configurable exclusion zones includes a first exclusion parameter defining a first minimum amount of optical code overlap with the exclusion zone required to reject the optical code, and a second one of the configurable exclusion zones includes a second exclusion parameter defining a second minimum amount of optical code overlap with the exclusion zone required to reject the optical code.

12. The method of claim 11 wherein the first minimum amount of optical code overlap is different from the second minimum amount of optical code overlap.

13. The method of claim 1 wherein the step of determining an extent to which the optical code overlaps with the exclusion zone comprises comparing a position within the scan volume of the optical code to a position within the scan volume of the configurable exclusion zone.

14. The method of claim 1 wherein the scan data located within the configurable exclusion zone is not processed for decodable data corresponding to the optical code.

15. The method of claim 1 wherein the data reader comprises an imaging based scanning system including an image sensor configured to capture an image of the scan volume and a position within the scan volume of the configurable exclusion zone is defined with respect to a location within the image.

16. The method of claim 1 wherein the data reader comprises an imaging based scanning system including an image sensor configured to capture an image of the scan volume and a position within the scan volume of the configurable exclusion zone is defined with respect to a location within the image and a position within a depth of field of the data reader.

17. The method of claim 1 wherein the data reader comprises a laser based scanning system configured to generate a scan pattern along a scan arc, project the scan pattern into the scan volume, and detect light reflected by the optical code for decoding the optical code, and a position within the scan volume of the configurable exclusion zone is defined with respect to one or more portions of the scan pattern generated by the laser based scanner.

18. The method of claim 1 wherein
    the data reader comprises an imaging based scanning system including an image sensor configured to capture an image of scan volume,
    the step of acquiring the scan data comprises acquiring, via the image sensor, an image of the optical code, and the step of processing the scan data comprises:
 extracting pixel data from the image of the optical code corresponding to a plurality of sub-regions, the plurality of sub-regions oriented with respect to one another in a pattern,
 detecting a set of edge transition locations in the pixel data and decoding the pixel data based on the set of edge transition locations, and
 storing a position within the image of the optical code.

19. The method of claim 1 wherein
 the data reader comprises an imaging based scanning system including an image sensor configured to capture an image of scan volume,
 the step of acquiring the scan data comprises acquiring, via the image sensor, an image of the optical code, and
 the step of processing the scan data comprises using a two-dimensional decoding algorithm to determine whether the scan data contains decodable data corresponding to the optical code, and if the scan data contains decodable data, storing a position within the image of the decodable data corresponding to the optical code.

20. The method of claim 1 wherein
 the data reader comprises a laser based scanning system configured to generate a scan pattern along a scan arc, project the scan pattern into the scan volume, and detect light reflected by the optical code for decoding the optical code,
 the step of acquiring the scan data comprises scanning, via the laser based scanning system, the optical code, and recording a position within the scan pattern of the scanning beam during the scan, and
 the step of processing the scan data comprises detecting a set of edge transition locations in each scan line of the scan pattern and decoding the scan data based on the set of edge transition locations, and storing a position within the scan pattern of the optical code.

21. The method of claim 1, further comprising:
 configuring the configurable exclusion zone by reading one or more configuration commands defining a position within the scan volume of the configurable exclusion zone and the first exclusion parameter.

22. The method of claim 1, further comprising:
 configuring the configurable exclusion zone by interactively training the data reader.

23. The method of claim 22 wherein
 the data reader comprises an imaging based scanning system including an image sensor configured to capture an image of the scan volume, and
 the step of configuring the configurable exclusion zone by interactively training the data reader comprises acquiring, via the image sensor, an image of the scan volume, displaying on a display the image, and receiving from a user an indication of a location on the displayed image of the configurable exclusion zone.

24. A method of processing an optical code disposed within a scan volume of a data reader, comprising the steps of:
 acquiring, via the data reader, scan data including an image or scan of an optical code located within the scan volume of the data reader, the scan volume having associated therewith a configurable exclusion zone;
 processing the scan data for decodable data corresponding to the optical code;
 determining whether to reject the optical code based on a position within the scan volume of the optical code relative to the configurable exclusion zone; and
 if a determination is made to not reject the optical code, decoding the optical code and transmitting decoded data from the optical code to a host along with an indication that the optical code has been read.

25. The method of claim 24 wherein a configuration of the configurable exclusion zone is selected from the group consisting of a type 1 configuration in which an optical code is rejected if the entire optical code is within the exclusion zone, a type 2 configuration in which an optical code is rejected if a centroid of an optical code is within the exclusion zone, and a type 3 configuration in which an optical code is rejected if any portion of an optical code is within the exclusion zone.

26. The method of claim 24 wherein the optical code is rejected if at least a portion of the optical code is within the configurable exclusion zone and comprises a predefined optical code symbology type.

27. The method of claim 24 wherein the optical code is rejected if at least a portion of the optical code is within the configurable exclusion zone and has embedded therein a predefined type of data.

28. The method of claim 24 wherein the optical code is rejected if at least a portion of the optical code is within the configurable exclusion zone and has embedded therein predefined data values.

29. The method of claim 24 wherein at least a portion of the scan data is not processed based on a proximity of the scan data to the configurable exclusion zone.

30. The method of claim 24, wherein the step of determining whether to reject the optical code is performed without projecting an aiming pattern into the scan volume and without regard to whether the aiming pattern intersects the optical code.

31. A method of configuring a data reader to selectively reject optical codes from a scan volume of the data reader, the method comprising the steps of:
 defining a set of exclusion zones located within the scan volume of the data reader; and
 for each exclusion zone, defining an amount of optical code overlap with the exclusion zone required to reject an optical code that is located within the scan volume.

32. The method of claim 31, further comprising:
 for each exclusion zone, defining a set of optical code symbology types to reject if an overlap with the exclusion zone is rejectable.

33. The method of claim 31, further comprising:
 for each exclusion zone, defining a set of optical code data types to reject if an overlap with the exclusion zone is rejectable.

34. A method of configuring a data reader to selectively read and accept predetermined optical codes from a scan volume of the data reader, the method comprising the steps of:
 defining a set of exclusion zones within the scan volume of the data reader; and
 for each exclusion zone, defining an amount of optical code overlap with the exclusion zone required to reject the optical code, wherein the step of defining the set of exclusion zones comprises decoding a plurality of optical codes within the scan volume of the data reader, storing a position within the scan volume of each optical code, and creating an exclusion zone corresponding to the position within the scan volume of each optical code.

35. A system for processing optical codes within a scan volume of a data reader, comprising:
 a data reader configured to acquire scan data from the scan volume of the data reader, the scan volume having associated therewith a configurable exclusion zone;
 a memory for storing a position within the scan volume of the configurable exclusion zone and a first exclusion parameter defining a minimum amount of optical code overlap with the exclusion zone required to reject an optical code; and a processor in communication with the data reader and the memory, the processor configured to:
  cause the data reader to acquire scan data representing an optical code located within the scan volume of the data reader;
  process the scan data for decodable data corresponding to the optical code;
  determine an extent to which the optical code overlaps with the exclusion zone;
  determine whether the extent to which the optical code overlaps with the exclusion zone meets or exceeds the minimum amount of optical code overlap defined by the first exclusion parameter; and
  if the extent to which the optical code overlaps with the exclusion zone does not meet or exceed the minimum amount of optical code overlap defined by the first exclusion parameter, report the acceptance of the optical code.

36. The system of claim 35 wherein
the memory has stored therein a second exclusion parameter defining one or more optical code symbology types to reject and a third exclusion parameter defining one or more optical codes to reject based on a data content of the optical code, and
the processor is further configured to report the acceptance of the optical code provided that a symbology type of the optical code does not correspond to one of the optical code symbology types defined by the second exclusion parameter and the optical code does not have embedded therein data correspond to the data content of one or more of the optical codes defined by the third exclusion parameter.

* * * * *

UNITED STATES PATENT AND TRADEMARK OFFICE
CERTIFICATE OF CORRECTION

| | | |
|---|---|---|
| PATENT NO. | : 8,322,617 B2 | Page 1 of 1 |
| APPLICATION NO. | : 12/698410 | |
| DATED | : December 4, 2012 | |
| INVENTOR(S) | : Craig Douglas Cherry | |

It is certified that error appears in the above-identified patent and that said Letters Patent is hereby corrected as shown below:

In the Specification

Column 3, Line 46, before "data", change "an" to --a--.

Column 3, Line 53, before "laser", change "an" to --a--.

Column 5, Line 61, change "have" to --having--.

Column 7, Line 5, change "though" to --through--.

Column 11, Line 52, change "coded" to --code--.

Column 16, Line 42, change "or" to --of--.

Column 23, Line 56, change "possible" to --possibly--.

Column 29, Line 11, change "N 1" to --N≥1--.

Column 33, Line 8, after "may" insert --be--.

In the Claims

Column 38, Line 15, change "correspond" to --corresponding--.

Signed and Sealed this
Second Day of December, 2014

Michelle K. Lee
*Deputy Director of the United States Patent and Trademark Office*